US008856748B1

(12) United States Patent
Larsen et al.

(10) Patent No.: US 8,856,748 B1
(45) Date of Patent: Oct. 7, 2014

(54) MOBILE APPLICATION TESTING PLATFORM

(71) Applicant: Xamarin Inc., San Francisco, CA (US)

(72) Inventors: Jonas Maturana Larsen, Tilst (DK); Vinicius Scopel Depizzol, San Francisco, CA (US); Nathaniel Dourif Friedman, San Francisco, CA (US); Karl Krukow, Hinnerup (DK); David Siegel, San Francisco, CA (US); Jason Adam Smith, Walnut Creek, CA (US)

(73) Assignee: Xamarin Inc., San Francisco, CA (US)

( * ) Notice: Subject to any disclaimer, the term of this patent is extended or adjusted under 35 U.S.C. 154(b) by 0 days.

(21) Appl. No.: 14/029,631

(22) Filed: Sep. 17, 2013

(51) Int. Cl.
G06F 9/44 (2006.01)
G06F 11/36 (2006.01)

(52) U.S. Cl.
CPC .................................. *G06F 11/3668* (2013.01)
USPC .......................................................... 717/125

(58) Field of Classification Search
CPC ........................................................ G06F 11/16
See application file for complete search history.

(56) References Cited

U.S. PATENT DOCUMENTS

| 6,662,217 | B1 | 12/2003 | Godfrey et al. |
| 7,415,635 | B1 * | 8/2008 | Annangi ..................... 714/38.12 |
| 8,171,127 | B2 | 5/2012 | Frost et al. |
| 8,171,406 | B1 * | 5/2012 | Newstadt et al. ............. 715/700 |
| 2008/0139195 | A1 | 6/2008 | Marsyla et al. |
| 2011/0041121 | A1 | 2/2011 | Schalk |
| 2011/0185231 | A1 * | 7/2011 | Balestrieri et al. .............. 714/27 |
| 2011/0210907 | A1 | 9/2011 | Martin-Cocher et al. |
| 2011/0251988 | A1 | 10/2011 | Pronk et al. |
| 2012/0035904 | A1 * | 2/2012 | Seckendorf et al. ............ 703/21 |
| 2012/0198279 | A1 | 8/2012 | Schroeder |
| 2012/0253745 | A1 | 10/2012 | Dhanapal et al. |
| 2013/0080502 | A1 | 3/2013 | McColl et al. |
| 2013/0081001 | A1 | 3/2013 | McColl et al. |
| 2013/0152047 | A1 * | 6/2013 | Moorthi et al. ............... 717/124 |
| 2013/0179144 | A1 | 7/2013 | Lu et al. |
| 2013/0179865 | A1 * | 7/2013 | Neumeyer et al. ............ 717/127 |
| 2013/0196600 | A1 | 8/2013 | Capers et al. |
| 2013/0318397 | A1 * | 11/2013 | Jamison .......................... 714/32 |
| 2013/0326465 | A1 | 12/2013 | Jain et al. |

OTHER PUBLICATIONS

Official Communication received in U.S. Appl. No. 14/029,663 mailed Jan. 30, 2014.
Official Communication received in U.S. Appl. No. 14/029,670 mailed Dec. 24, 2013.

\* cited by examiner

*Primary Examiner* — Philip Wang
(74) *Attorney, Agent, or Firm* — John W. Branch; Lowe Graham Jones PLLC

(57) ABSTRACT

Embodiments are directed towards testing mobile applications for a plurality of mobile computers. A server computer may be provided a mobile application, a test script, and mobile computer criteria. One or more mobile computers may be filtered from a larger set on the mobile computer criteria. The server computer may install the mobile application on each determined mobile computer. Next, each portion of the test script for the mobile application may be performed and/or executed on each determined mobile computer, wherein a result for each performed portion may be stored. During the test run at least one screenshot may be generated based on at least one performed portion of the test script, wherein the screenshots may be stored. The server computer may generate a displayable report that may include each screenshot and a result for each performed portion of the test script.

26 Claims, 25 Drawing Sheets

```
2402 → phone.InputText ("Username", "Joe");
2404 → phone.InputText ("Password", "pass123");
2406 → phone.Press ("Log In");
2408 → phone.WaitForScreen ("Main Screen");
2410 → phone.AssertVisible ("Logged In");
2412 → phone.Screenshot ();
```

MOBILE APPLICATION TESTING PLATFORM

TECHNICAL FIELD

This invention relates generally to mobile application development, and more particularly, but not exclusively, to deploying mobile application code to a testing platform in a cloud-based environment.

BACKGROUND

A highly competitive mobile application marketplace and the consumerization of information technology have put tremendous pressure on mobile application developers to deliver high quality mobile user experiences for both consumers and employees. In this competitive environment, a small defect or failure may lead to permanent application abandonment or poor reviews. Moreover, device fragmentation, with hundreds of mobile computers on the market for a variety of different mobile operating systems, multiplies quality assurance efforts resulting in a time-consuming and costly development process. The difficulties associated with providing sufficient quality assurance may be further aggravated by faster release cycles for mobile applications, which may necessitate more stringent and efficient regression testing. Furthermore, since user-interfaces for mobile applications may also change often, traditional user-interface testing tools that often may require significant investment to configure and set up may rely on fragile methods for defining correct user-interface behavior. Accordingly, failure to keep these user- interface testing tools in sync with the faster-release cycles for mobile applications may often lead to broken or ineffective test cases. In addition, many traditional user-interface test tools do not provide cross-platform support and may be difficult to integrate into mobile application developer tools and workflow. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein:

FIG. 24 shows an example of a portion of a test script in accordance with at least one of the various embodiments.

DESCRIPTION OF THE VARIOUS EMBODIMENTS

Figure 1:
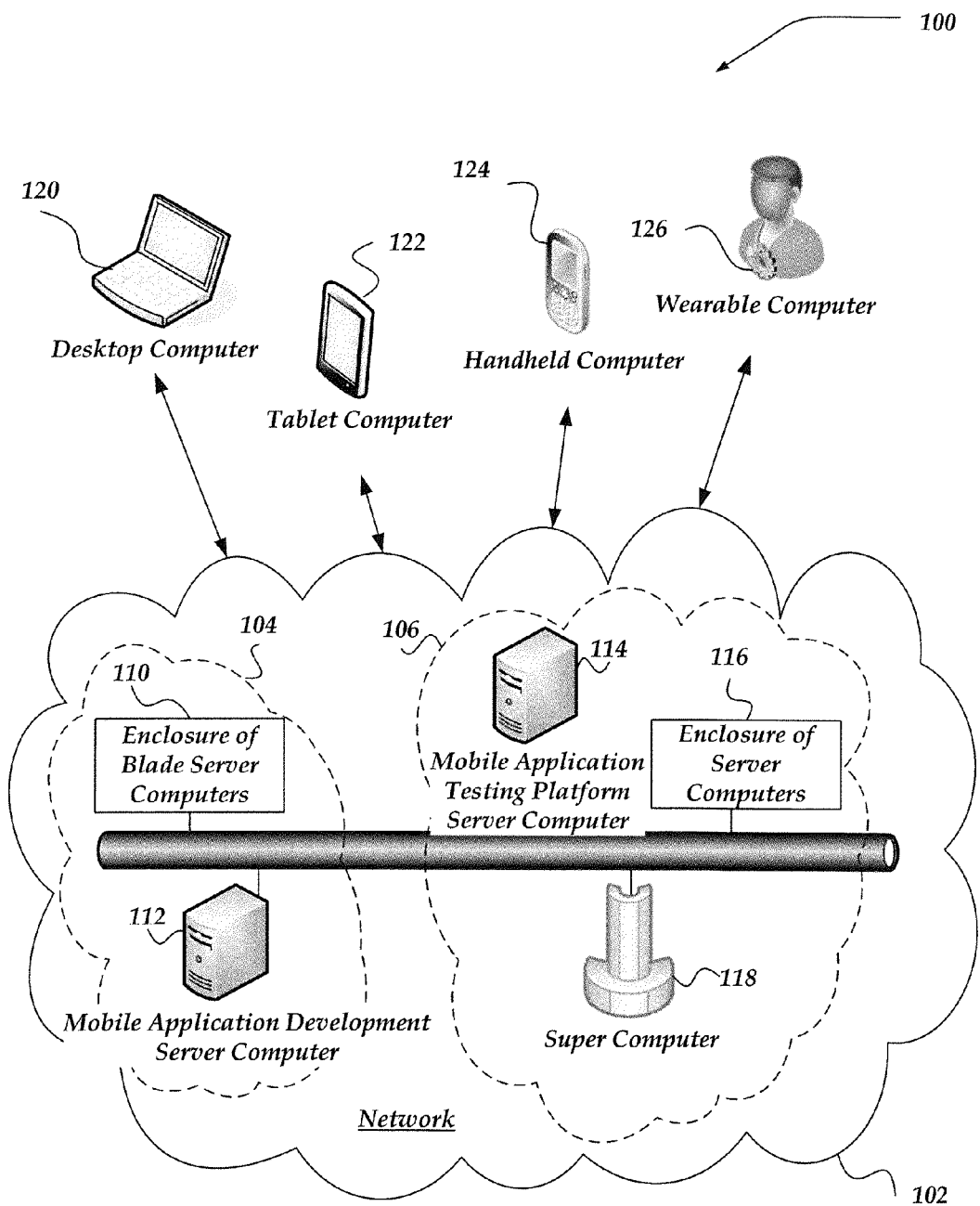
FIG. 1 illustrates a system environment in which various embodiments may be implemented.

The present innovations now will be described more fully hereinafter with reference to the accompanying drawings, which form a part hereof, and which show, by way of illustration, specific embodiments by which the innovations may be practiced. These innovations may, however, be embodied in many different forms and should not be construed as limited to the embodiments set forth herein; rather, these embodiments are provided so that this disclosure will be thorough and complete, and will fully convey the various embodiments to at least those skilled in the art. Among other things, the present innovations may be embodied as methods, computers, or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "mobile application" as used herein refers to a computing/software application designed to operate on a mobile computer. While the term mobile application is used throughout this description, one of ordinary skill in art the will appreciate that other type of applications may benefit from these innovations and are well within the scope and spirit of the disclosed innovations, including, but not limited to, web applications, web pages, "desktop" applications, or the like.

The term "mobile application developer" as used herein refers to users that design and develop mobile applications. Mobile application developers may create and deploy mobile application to the mobile application testing platform.

The term "mobile computer" as used herein refers networked computers and may include tablet computers, handheld computers, wearable computers, desktop computers, or the like. Mobile computers may also include notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding computers, or the like.

The term "test script" as used herein refers to a script (e.g. program) that may be written in various computer software languages, such as, Ruby, C# (C-sharp), Objective-C, Java, JavaScript, C, C++, or the like. Generally, test scripts may be written in any known and/or custom computer software language. In at least one of the various embodiments, test scripts may be arranged to include one or more test steps within a test script. Further, in at least one of the various embodiments, test scripts may include additional information used for configuring tests, such as, scheduling information (e.g., when to run the test, how often to run the test, or the like), reporting configuration (e.g., notification rules, report formatting, or the like), mobile computer criteria, or the like.

The term "test step" as used herein refers to a test step may be a portion of a script arranged to perform one or more actions on the mobile computers currently being tested. In at least one of the various embodiments, one or more test steps may be grouped and/or organized into a test and/or included in a test script.

The term "mobile computer criteria" as used herein refers to information provided to the mobile application testing platform for use in identifying and/or filtering mobile computers. Mobile computer criteria may be used in various contexts to filter computers for testing from a larger collection. (E.g., Such as those computers that should be included in a particular test run.) Mobile computer criteria information may comprise, screen size, screen resolution, screen pixel density, operating system, operating system version, input method (e.g., keypad, touch, voice, or the like), processor speed, processor type, memory capacity, manufacturer, market share, installed other applications, GPS availability, past test performance, camera characteristics, or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards testing mobile applications on a plurality of mobile computers. In at least one the various embodiments, a server computer may be provided a mobile application, at least one test script, and at least one mobile computer criteria. In at least one of the various embodiments, the mobile application may be uploaded or otherwise loaded on the server computer. Further, the mobile computer criteria included with the uploaded mobile application may include at least a type of operating system for the mobile application. In at least one of the various embodiments, at least one mobile computer from a plurality of mobile computers may be determined based on at least the mobile computer criteria. Also, in at least one of the various embodiments, each determined mobile computer is in communication with the server computer over a network. In at least one of the various embodiments, the server computer may install the mobile application on each determined mobile computer. Next, each portion of the at least one test script for the mobile application may be performed and/or executed on each determined mobile computer, wherein a result for each performed portion may be stored on the server computer. During the test run at least one screenshot on each determined mobile computer may be generated based on at least one performed portion of the at least one test script, wherein the at least one screenshot may be stored on the server computer for use in reports. In at least one of the various embodiments, the server computer may generate a displayable report that may include each screenshot and a result for each executed portion of the at least one test script.

In at least one of the various embodiments, at least one performance metric for each determined mobile computer may be generated during testing. In at least one of the various embodiments, the determined performance metrics may correspond to the execution of at least a portion of the test script. For example, performance metrics may include memory usage, CPU utilization, or the like. In at least one of the various embodiments, determining the at least one mobile computers may be based on one or more provided mobile computer criteria, including, but not limited to, a screen size, a screen resolution, an operating system, an input method, a processor speed, a memory capacity, a manufacturer, a storage media capacity, or a market share for sales in at least one country.

Further, in at least one of the various embodiments, a sidebar interface that includes at least one list item that may correspond to the execution of at least a portion of the test script may be displayed. And, in at least one of the various embodiments, a result status for each test based on the results of the execution of the portion of the test script may be determined. And, in at least one of the various embodiments, at least one icon may be displayed in each list item, such that each icon indicates a result status of the execution of the corresponding portion of the test script.

In at least one of the various embodiments, one or more performance metrics associated with each tested mobile computer may be compared. Each variation of the one or more performance metrics for each tested mobile computer may be displayed based on the comparison and a previously determined comparison for at least another mobile computer.

In at least one of the various embodiments, the mobile application test platform may be integrated with an integrated development environment (IDE) such that if the mobile application is successfully built (e.g., compiled, linked, and packaged into an installable mobile application), a user interface, such as a menu link, of the IDE may be activated to enable testing of the mobile application.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computer. As shown, the networked computers may include mobile application development server computer 112, mobile application testing platform server computer 114, enclosure of blade server computers 110, enclosure of server computers 116, super computer 118, and the like. Although not shown, one or more mobile computers may be included in cloud network 102 in one or more arrangements to provide one or more network services to a user. Also, these arrangements of networked computers may or may not be mutually exclusive of each other.

In at least one of the various embodiments, mobile application development server computer 112 may include module, processes, components, services, or the like, used by mobile application developers for developing mobile applications, and the like. Also, in at least one of the various embodiments, mobile application testing platform server computer 114 may include processes, modules, services, components, or the like, for receiving mobile applications for testing, managing testing of mobile applications, generating reports based testing results, as well as requests and other communications to and from client computers that may be running various client applications. Mobile application testing platform server computer 114 may perform actions further described in conjunction with FIGS. 5-23.

Also, in at least one of the various embodiments, enclosure of blade server computers 110, enclosure of enclosure of server computers 116, super computer 118 may include computers that perform the actions of mobile application testing platform server computer 114.

Additionally, the user may employ a plurality of virtually any type of wired or wireless networked computers to communicate with cloud network 102 and access at least one of the network services enabled by one or more of arrangements 104 and 106. These networked computers may include tablet computer 122, handheld computer 124, wearable computer 126, desktop computer 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding computers, and the like.

One embodiment of a client computer is described in more detail below in conjunction with FIG. 3. Generally, client computers may include virtually any substantially portable networked computer capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computers could be remotely connected to networks via a modem and a temporary communication link. In essence, network 102 may include virtually any communication technology by which information may travel between computers. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network computers such as terminals, gateways, routers, switches, firewalls, load balancers, and the like, which are coupled to wired and/or wireless communication links. These autonomous computers may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile computers. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile computer to wirelessly access a network service through a combination of several radio network access technologies such as GSM, EDGE, SMS, HSDPA, LTE and the like.

Enclosure of Blade Server Computers

Figure 2A:
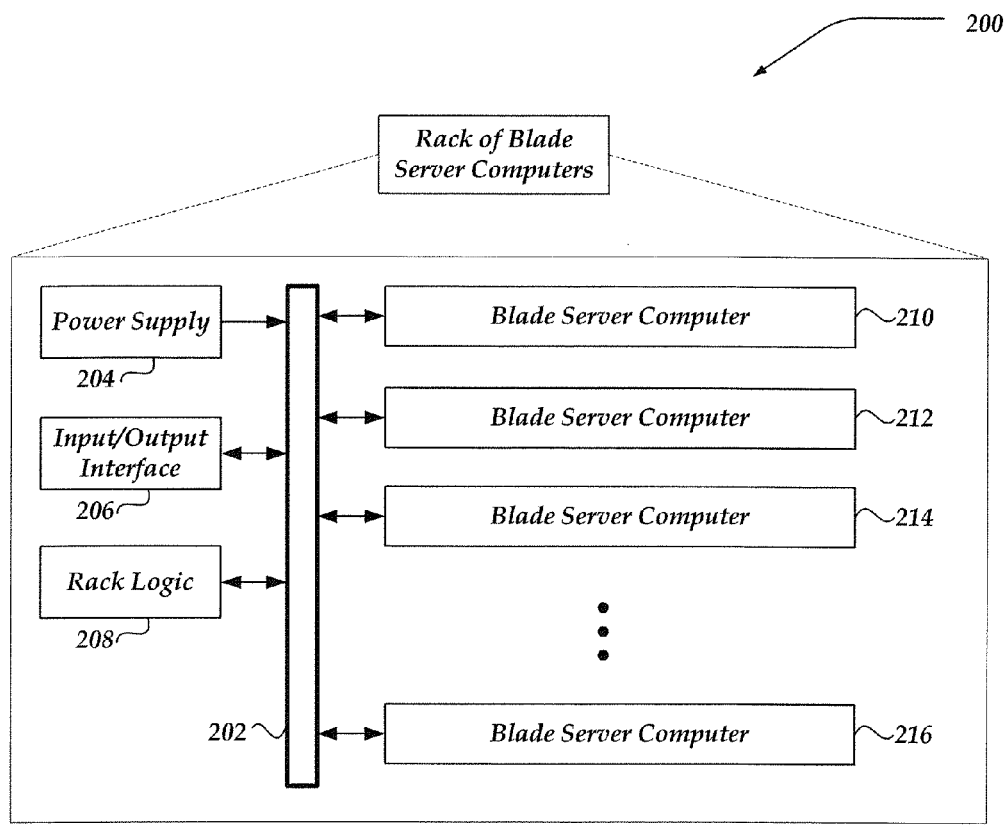
FIG. 2A shows a schematic drawing of a rack of blade server computers.

FIG. 2A shows one embodiment of an enclosure of blade server computers 200, which are also illustrated in FIG. 1. Enclosure of blade server computers 200 may include many more or fewer components than those shown in FIG. 2A. However, the components shown are sufficient to disclose an illustrative embodiment. Generally, a blade server computer is a stripped down computer with a modular design optimized to minimize the use of physical space and energy. A blade enclosure can include several blade server computers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade server computers 210, 212, 214, and 216, and backplane 202. Power supply 204 provides power to each component and blade server computer within the enclosure. The input/output interface 206 provides internal and external communication for components and blade server computers within the enclosure. Backplane 208 can enable passive and active communication of power, logic, input signals, and output signals for each blade server computer.

Illustrative Blade Server Computer

Figure 2B:
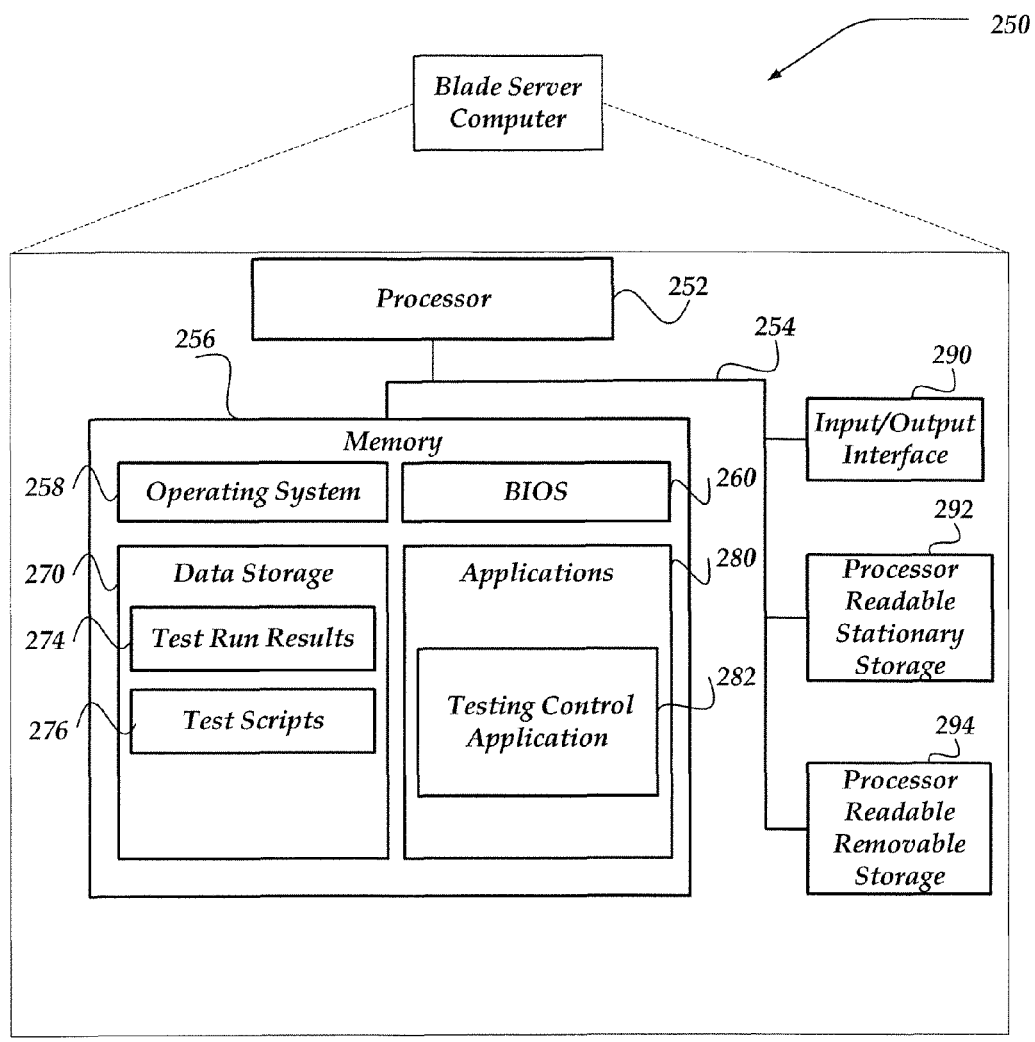
FIG. 2B illustrates a schematic embodiment of a blade server computer that may be included in a rack of blade server computers such as that shown in FIG. 2A.

FIG. 2B illustrates an illustrative embodiment of blade server computer 250, which may include many more or fewer components than those shown. As shown in FIG. 2A, a plurality of blade server computers may be included in one enclosure that shares resources provided by the enclosure to reduce size, power, and cost.

Blade server computer 250 includes processor 252 which communicates with memory 256 via bus 254. Blade server computer 250 also includes input/output interface 290, processor-readable stationary storage device 292, and processor-readable removable storage device 294. Input/output interface 290 can enable blade server computer 250 to communicate with other blade server computers, mobile computers, network computers, and the like. Interface 290 may provide wireless and/or wired communication links for blade server computer. Processor-readable stationary storage device 292 may include one or more devices such as an electromagnetic storage device (hard disk), solid state hard disk (SSD), hybrid of both an SSD and a hard disk, and the like. In some configurations, a blade server computer may include multiple storage devices. Also, processor-readable removable storage device 294 enables processor 252 to read non-transitory storage media for storing and accessing processor-readable instructions, code, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server computer 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server computer 250 to store, among other things, applications 280 and/or other data. Data store 270 may include program code, instructions, data, algorithms, and the like, for use by processor 252 to execute and perform actions such as those described in conjunction with FIGS. 5-23. In one embodiment, at least some of datastore 270 might also be stored on another component of blade server computer 250, including, but not limited to, processor-readable removable storage device 294, processor-readable stationary storage device 292, or any other non-transitory processor-readable storage device (not shown). Data storage 270 may include, for example, test run results 274, test scripts 276, or the like. Test run results 274 may contain various data generated from testing mobile applications, include various measured metrics for tested applications, log files, event files, stack traces, or the like. Likewise, test scripts 276 may contain scripts and/or programs that may be employed to test mobile applications, as well as, other supporting data, arranged in lists, databases, configuration files, or the like.

Applications 280 may include processor executable instructions which, when executed by blade server computer 250, transmit, receive, and/or otherwise process messages, audio, video, and enable communication with other networked computers. Examples of application programs include database servers, file servers, calendars, transcoders, and so forth. Applications 280 may include, for example, testing control application 282, which may be enabled to perform actions further described below in conjunction with FIGS. 5-23.

Human interface components (not pictured), may be remotely associated with blade server computer 250, which can enable remote input to and/or output from blade server computer 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, testing control application 282 may be operative in a cloud-based computing environment. In at least one of the various embodiments, this application, and others, that comprise the mobile application testing platform may be executing within virtual machines and/or virtual servers that may be managed in a cloud-based based computing environment. In at least one of the various embodiments, in this context the applications may flow from one physical blade server computer and/or network computer within the cloud-based environment to another depending on performance and scaling considerations automatically managed by the cloud computing environment. Likewise, in at least one of the various embodiments, virtual machines and/or virtual servers dedicated to running testing control application 282 may be provisioned and de-commissioned automatically.

Also, in at least one of the various embodiments, test run results 274, test scripts 276, or the like, may be located on virtual servers running in a cloud-based computing environment rather than being tied to one or more specific physical blade server computers.

Illustrative Mobile Computer

Figure 3:
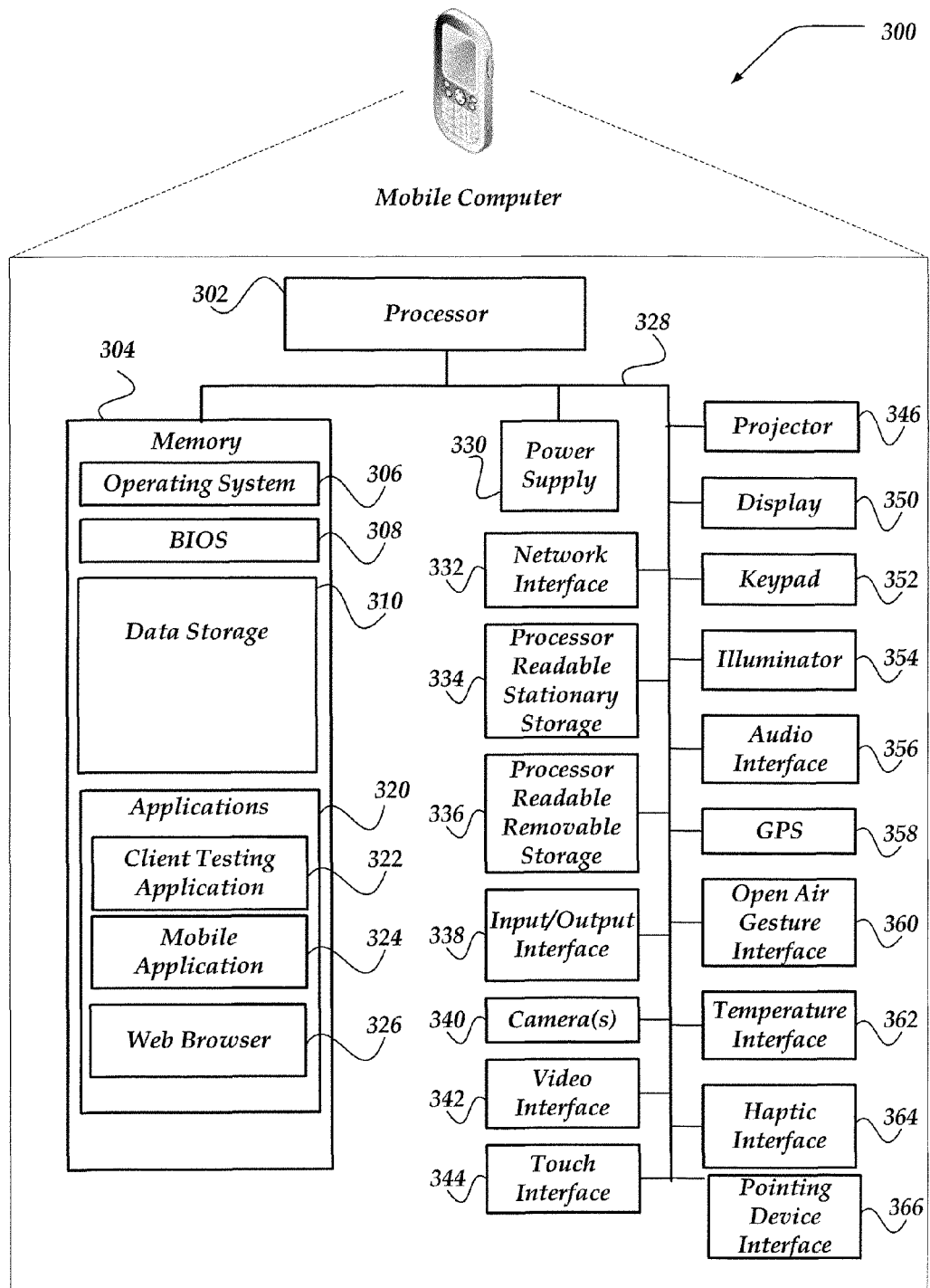
FIG. 3 shows a schematic embodiment of a mobile computer.

FIG. 3 shows one embodiment of mobile computer 300 that may include many more or less components than those shown. Mobile computer 300 may represent, for example, at least one embodiment of mobile computers shown in FIG. 1.

Mobile computer 300 may include processor 302 in communication with memory 304 via bus 328. Mobile computer 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Mobile computer 300 may optionally communicate with a base station (not shown), or directly with another computer. And in one embodiment, although not shown, a gyroscope may be employed within mobile computer 300 to measuring and/or maintaining an orientation of mobile computer 300.

Power supply 330 may provide power to mobile computer 300. A rechargeable or non-rechargeable battery may be used to provide power. The power may also be provided by an external power source, such as an AC adapter or a powered docking cradle that supplements and/or recharges the battery.

Network interface 332 includes circuitry for coupling mobile computer 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile computer 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computer. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the mobile computer is powered. Also, illuminator 354 may backlight these buttons in various patterns when particular actions are performed, such as dialing another mobile computer. Illuminator 354 may also cause light sources positioned within a transparent or translucent case of the mobile computer to illuminate in response to actions.

Mobile computer 300 may also comprise input/output interface 338 for communicating with external peripheral devices or other computers such as other mobile computers and network computers. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the mobile computer. For example, the haptic interface 364 may be employed to vibrate mobile computer 300 in a particular way when another user of a computer is calling. Temperature interface 362 may be used to provide a temperature measurement input and/or a temperature changing output to a user of mobile computer 300. Open air gesture interface 360 may sense physical gestures of a user of mobile computer 300, for example, by using single or stereo video cameras, radar, a gyroscopic sensor inside a computer held or worn by the user, or the like. Camera 340 may be used to track physical eye movements of a user of mobile computer 300.

GPS transceiver 358 can determine the physical coordinates of mobile computer 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile computer 300 on the surface of the Earth. It is understood that under different conditions, GPS transceiver 358 can determine a physical location for mobile computer 300. In at least one embodiment, however, mobile computer 300 may, through other components, provide other information that may be employed to determine a physical location of the mobile computer, including for example, a Media Access Control (MAC) address, IP address, and the like.

Human interface components can be peripheral devices that are physically separate from mobile computer 300, allowing for remote input and/or output to mobile computer 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer may include a browser application that is configured to receive and to send web pages, web-based messages, graphics, text, multimedia, and the like. The mobile computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of mobile computer 300. The memory may also store operating system 306 for controlling the operation of mobile computer 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by mobile computer 300 to store, among other things, applications 320 and/or other data. For example, data storage 310 may also be employed to store information that describes various capabilities of mobile computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile computer 300, including, but not limited to, non-transitory processor-readable removable storage device 336, processor-readable stationary storage device 334, or even external to the mobile computer.

Applications 320 may include computer executable instructions which, when executed by mobile computer 300, transmit, receive, and/or otherwise process instructions and data. Applications 320 may include, for example, client test application 322. In at least one of the various embodiments, client test application 322 may be used to exchange communications to and from mobile application testing platform server computer 114, including, but not limited to, queries, searches, API calls, or the like. Mobile application 324 may provide various application services for users. Client test application 322 may be employed to remote control mobile application 324 based on test scripts that may be provided by mobile application testing platform server computer 114.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Computer

Figure 4:
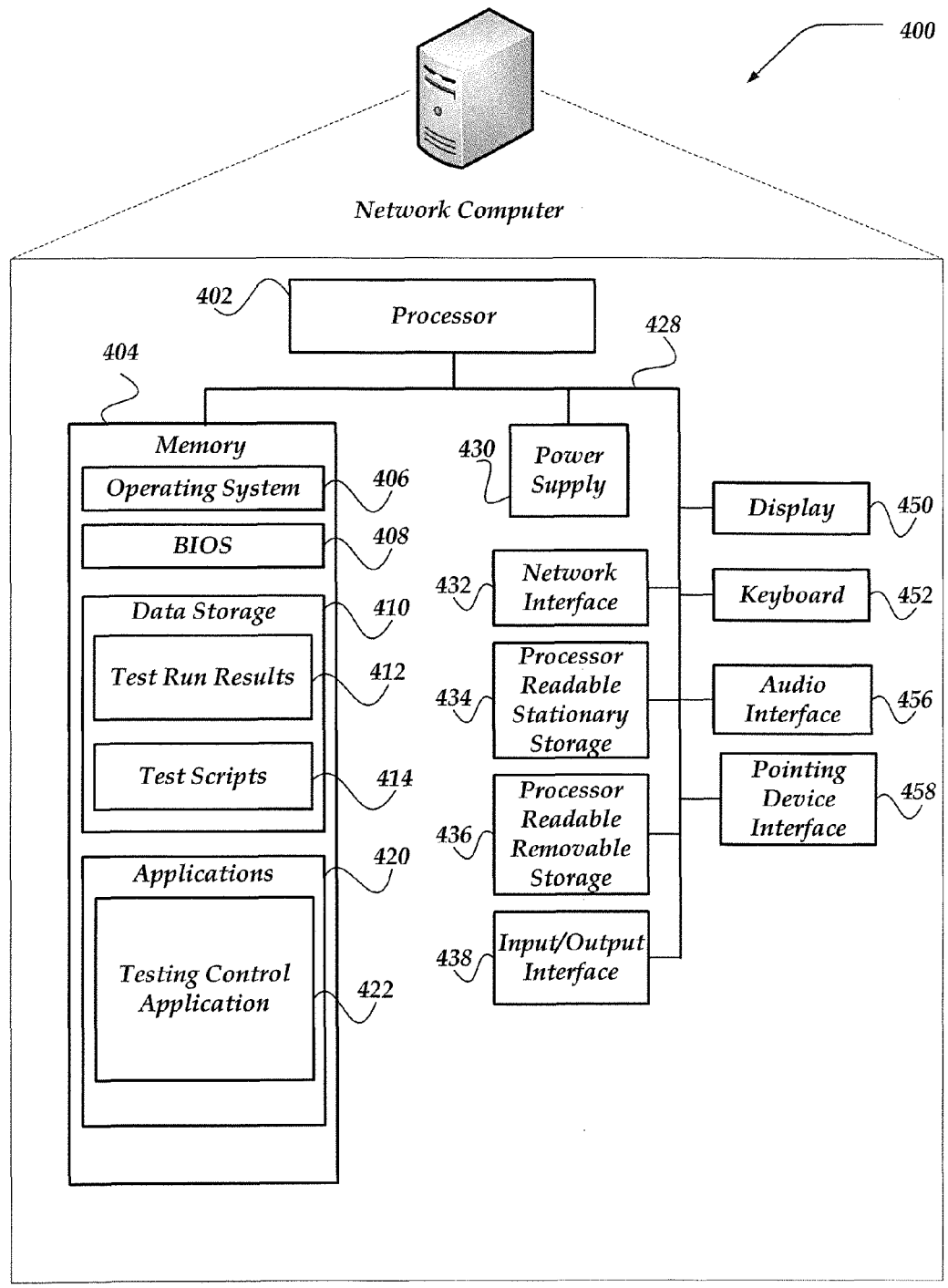
FIG. 4 illustrates a schematic embodiment of a network computer.

FIG. 4 shows one embodiment of network computer 400 that may be included in a system implementing the invention. Network computer 400 may include many more or less components than those shown in FIG. 4. However, the components shown are sufficient to disclose an illustrative embodiment for practicing these innovations. Network computer 400 may represent, for example, one embodiment of at least one of network computer 112, 114, or 120 of FIG. 1.

As shown in the figure, network computer 400 includes a processor 402 in communication with a memory 404 via a bus 428. Network computer 400 also includes a power supply 430, network interface 432, audio interface 456, display 450, keyboard 452, input/output interface 438, processor-readable stationary storage device 434, and processor-readable removable storage device 436. Power supply 430 provides power to network computer 400.

Network interface 432 includes circuitry for coupling network computer 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network computer 400 may optionally communicate with a base station (not shown), or directly with another computer.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network computer 400, for example, using voice recognition.

Display 450 may be a liquid crystal display (LCD), gas plasma, electronic ink, light emitting diode (LED), Organic LED (OLED) or any other type of light reflective or light transmissive display that can be used with a computer. Display 450 may be a handheld projector or pico projector capable of projecting an image on a wall or other object.

Network computer 400 may also comprise input/output interface 438 for communicating with external devices or computers not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network computer 400, allowing for remote input and/or output to network computer 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network computer 400. The memory also stores an operating system 406 for controlling the operation of network computer 400. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network computer 400 to store, among other things, applications 420 and/or other data. For example, data storage 410 may also be employed to store information that describes various capabilities of network computer 400. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those actions described in conjunction with FIGS. 5-23. In one embodiment, at least some of data storage 410 might also be stored on another component of network computer 400, including, but not limited to, non-transitory media inside processor-readable removable storage device 436, processor-readable stationary storage device 434, or any other computer-readable storage device within network computer 400, or even external to network computer 400. Data storage 410 may include, for example, test run results 412, or test scripts 414.

Applications 420 may include computer executable instructions which, when executed by network computer 400, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include testing control application 422 which may be enabled to perform actions further described below in conjunction with FIGS. 5-23. In at least one of the various embodiments, testing control application 422 may be implemented as modules and/or components of the same application. Further, in at least one of the various embodiments, testing control application 422 may be implemented as operating system extensions, modules, plugins, or the like.

Furthermore, in at least one of the various embodiments, testing control application 422 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to running testing control application 422 may be provisioned and de-commissioned automatically.

Also, in at least one of the various embodiments, test run results 412, test scripts 414, or the like, may located in virtual servers running in a cloud-based computing environment rather than being tied to one or more specific physical blade server computers or network computers.

Illustrative Architecture for a Mobile Application Testing Platform

In at least one of the various embodiments, a mobile application testing platform may be a system that enables mobile application developers to upload their mobile applications over a network to a mobile application testing platform for testing the quality and performance of the mobile application.

Figure 5:
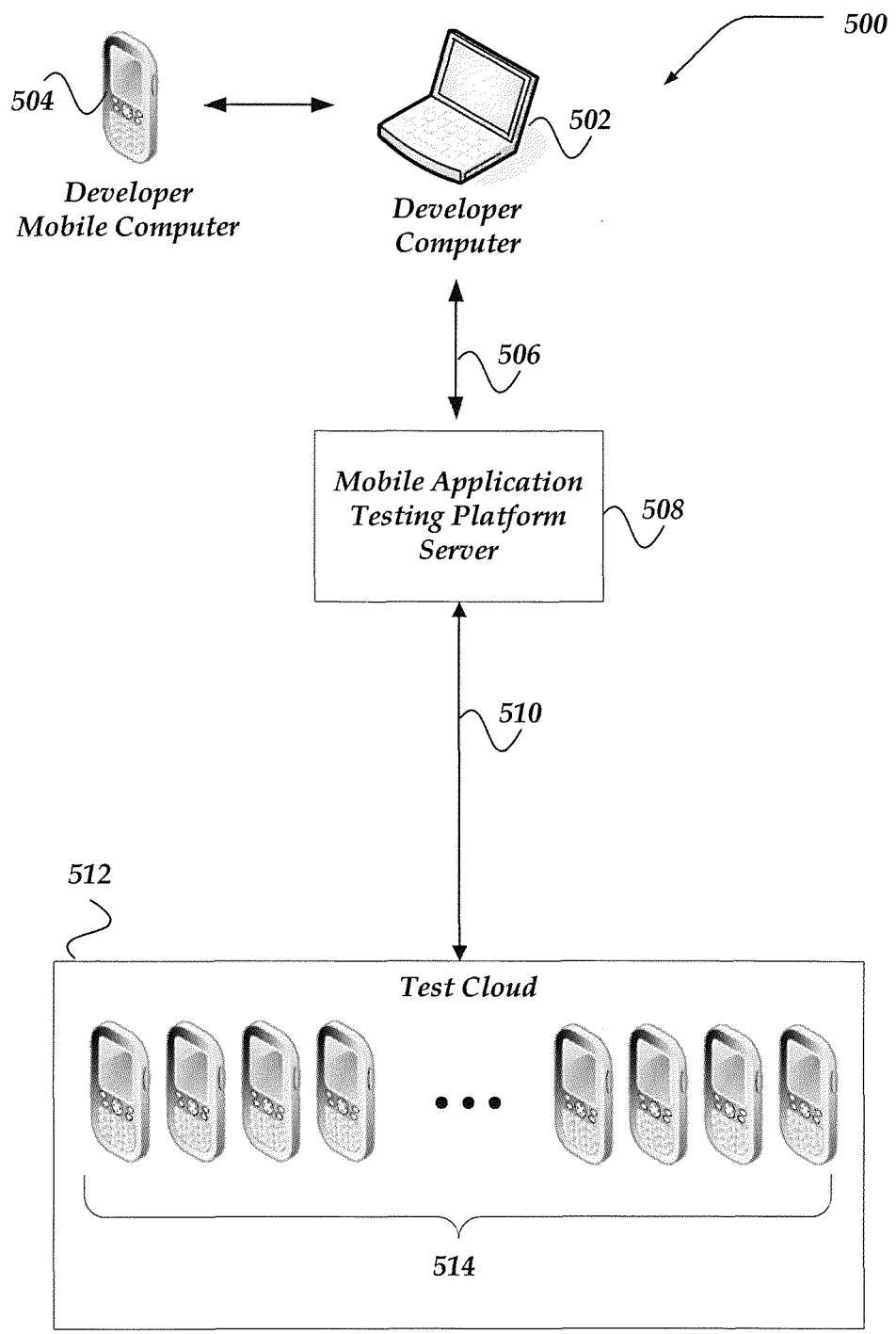
FIG. 5 illustrates a portion of a logical architecture of for a mobile application testing platform in accordance with at least one of the various embodiments.

FIG. 5 illustrates a portion of logical architecture of for mobile application testing platform 500 in accordance with at least one of the various embodiments. In at least one of the various embodiments, one or more mobile application developers may be developing mobile applications using various computers, such as developer computer 502. In at least one of the various embodiments, mobile application developers may be using one or more local mobile computers, such as, developer mobile computer 504 for limited/local application testing.

In at least one of the various embodiments, application developers may upload applications and/or test scripts over network 506 to mobile application testing platform server 508. In at least one of the various embodiments, based on the provided application, content of the one or more test scripts, or other criteria, mobile application testing platform server 508 may deploy the uploaded application over network 510 to target test cloud 512. In at least one of the various embodiments, target test cloud 512 may comprise one or more mobile computers, such as, mobile computers 514 that may be used to test the uploaded applications. In at least one of the various embodiments, depending on the operating system, or other requirements, mobile applications may be arranged and/or configured to integrate with client test application 322 that may be installed on mobile computers 514.

In at least one of the various embodiments, mobile computers 514 may include various mobile computers from various manufacturers, makes, models, or the like. They may also include mobile computers with different versions of the operating systems that may be used with any particular mobile computer. In some cases, mobile computers 514 may include devices or computers such as mobile telephones, mobile tablets, digital music players, smart watches, or the like. In at least one of the various embodiments, test cloud 512 may be arranged to include numerous mobile computers to provide a reasonable coverage of mobile computers that may be targeted by the mobile application. For example, mobile computers 514 may include mobile computers from various manufacturers, different mobile device models from each manufacturer, mobile devices running different versions of the same operating system, or the like.

In at least one of the various embodiments, mobile computers 514 may include devices that have been loaded with particular client applications enabling interactions to be tested. For example, in some cases, one or more mobile computers in mobile computers 514 may be the same except they may be loaded with different applications, such as, different e-mail clients, map applications, social networking applications, or the like.

In at least one of the various embodiments, each mobile computer in test cloud 512 may be pre-loaded with client testing application 322, or the like. This may enable each mobile computer to be controlled by a testing controller application, such as, testing control application 282, or testing control application 422, or the like. In at least one of the various embodiments, client testing applications, such as, client testing application 322, or the like, may be arranged to use one or more well-known methods for remote controlling applications that may be operative on a mobile computer. Further, client testing applications may be arranged to communicate over a network with testing control applications, such as, testing control application 282, or testing control application 422.

In at least one of the various embodiments, each mobile computer in mobile computers 514 may be individually addressable by a test control application, such as, testing control application 422. In at least one of the various embodiments, each mobile computer may be identified using one or more built in mobile computer identifiers, such as, International Mobile Equipment Identity (IMEI), Mobile Equipment Identifier (MEID), Electronic Serial Number (ESN), International Mobile Subscriber Identity (IMSI), Unique Device Identifier (UDID), Android_ID, WLAN MAC address, other serial numbers, or the like. Also, in at least one of the various embodiments, the client testing application that may be installed on each mobile computer in mobile computers 514 may include a separate identifier that may be used to identify the mobile computer based on a value known by the client testing application.

In at least one of the various embodiments, each mobile computer in mobile computers 514 may be in communication with mobile application testing platform server 508 over one or more wired and/or wireless networks. Also, in at least one of the various embodiments, computers in mobile computers 514 may communicate with mobile application testing platform server 508 using Universal Serial Bus (USB) connections, or the like. Further, in at least one of the various embodiments, one or more of mobile computers 514 may be directly connected to one or more network computers that may proxy for communication between some or all of mobile computers 514 and mobile application testing platform server 508. For example, in at least one of the various embodiments, one or more mobile computers may be connected to a proxy network computer that forwards communication from the mobile computers to mobile application testing platform server 508. Likewise, the proxy network computer may forward communication from mobile application testing platform server 508 to one or more of mobile computers 514.

In at least one of the various embodiments, testing control applications that may be operative on mobile application testing platform 508 may employ one or more test scripts that enable it to send commands to mobile computers 514 that may be performed by the client testing application that is installed on each mobile computer. In at least one of the various embodiments, the mobile application testing platform may be arranged to communicate test scripts or portions of test scripts to the client testing application operative on each mobile computer. Subsequently, the client testing application executes the communicated test script on each mobile computer. Alternatively, in at least one of the various embodiments, a testing control application may be arranged to interpret one or more scripts and send individual commands over a network, such as, network 510, to the client testing application for each relevant mobile computer.

In at least one of the various embodiments, some mobile applications may be arranged to include a library and/or module that facilities remote control and interrogation by a client testing application. Such a library or module may be compiled and/or linked into the mobile application designated for testing by the mobile application developer. In other cases, there may be built in features of the mobile operating system that enable the client testing application to remote control other applications, and/or to monitor mobile applications that may be operative on the mobile computer. Further, in at least one of the various embodiments, mobile application may be arranged for testing by compiling them in "debug mode" which may enable a client testing application to have increased remote control and/or monitoring capability.

In at least one of the various embodiments, test scripts may be written in various computer software languages, such as, Ruby, C# (C-sharp), Objective-C, Java, JavaScript, C, C++, or the like. Generally, the client testing application and/or the mobile application testing platform may be arranged to receive test scripts written in any known and/or custom computer software language. In at least one of the various embodiments, the mobile application testing platform may include a testing control application that may be arranged to compile test scripts written in one or more source software languages into an intermediate/lower level code that may be interpreted by the client testing application that may be installed on each of mobile computers 514.

In at least one of the various embodiments, test scripts may be arranged to include one or more test steps within a test scripts. In at least one of the various embodiments, a test step may be arranged to perform one or more actions on the mobile computers that may be under test. In at least one of the various embodiments, one or more test steps may be grouped and/or organized into a test.

Further, in at least one of the various embodiments, test scripts may include additional information used for configuring the test(s), such as, scheduling information (e.g., when to run the test, how often to run the test, or the like), reporting configuration (e.g., notification rules, report formatting, or the like), mobile computer criteria, or the like.

Generalized Operation

FIGS. 6-15 represent the generalized operations of mobile application development in a cloud-based architecture in accordance with at least one of the various embodiments. In at least one of the various embodiments, processes 600, 700, 800, 900, 1000, 1100, 1200, 1300, 1400, and 1500 described in conjunction with FIGS. 6-15 may be implemented by and/or executed on a single network computer, such as network computer 400 of FIG. 4. In other embodiments, these processes or portions of process thereof may be implemented by and/or executed on a plurality of network computers, such as network computer 400 of FIG. 4. In yet other embodiments, these processes or portions thereof may be implemented by and/or executed on one or more blade server computers, such as blade server computer 250 of FIG. 2B. However, embodiments are not so limited and various combinations of network computers, blade server computers, or the like may be utilized. Further, in at least one of the various embodiments, the processes described in conjunction with FIGS. 6-15 may be operative in mobile application testing platform architectures such as those described in conjunction with FIG. 5.

Figure 6:
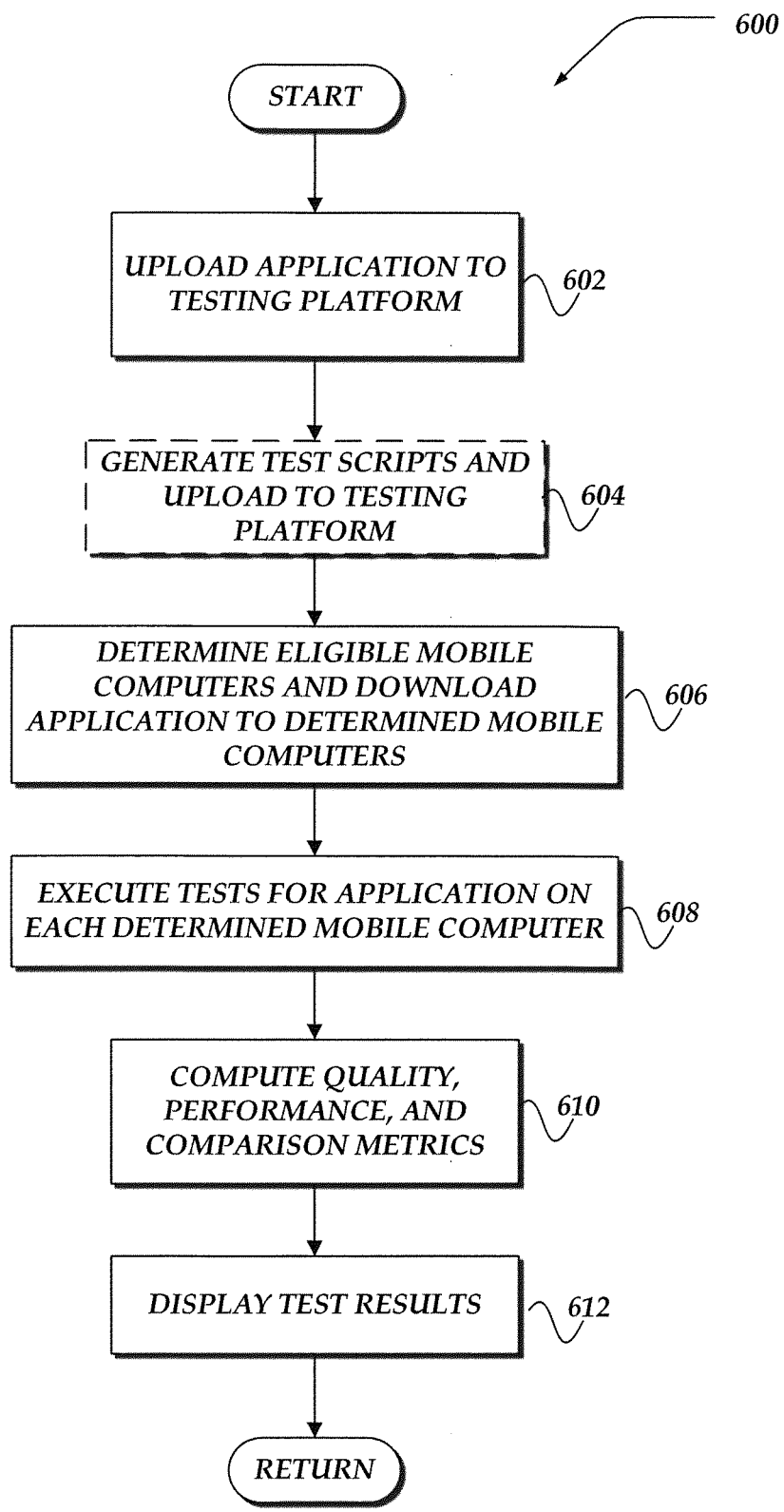
FIG. 6 shows an overview flowchart for a process for mobile application testing in accordance with at least one of the various embodiments.

FIG. 6 shows an overview flowchart for process 600 for mobile application testing in accordance with at least one of the various embodiments. After a start block, at block 602, in at least one of the various embodiments, a mobile application may be uploaded to the mobile application testing platform. In at least one of the various embodiments, application developers may upload on or more mobile applications for testing. In some cases, mobile applications may be uploaded manually or on-demand in other cases mobile applications may be automatically uploaded based on a configured schedule.

In at least one of the various embodiments, mobile application may need to compiled or linked with a helper module or library that enables the client testing application to remote control and/or monitor the mobile application. A determination of whether to include the helper module in the mobile application may be made based on the target operating system. For example, in at least one of the various embodiments, a mobile application targeted for Android devices (e.g., mobile computers using the Android operating system) omit linking with a helper module, whereas, mobile applications target for iOS devices (e.g., mobile computers using the iOS operating system) may require linking with a helper module. One of ordinary skill in the art will appreciate that the necessity of linking to a helper module may vary depending on the type and version operating systems, as well as, different mobile computers.

At block 604, in at least one of the various embodiments, optionally, test scripts may be generated and uploaded to the mobile application testing platform. In at least one of the various embodiments, one or more test scripts that may have created for testing the mobile application may be generated by the mobile application developer and uploaded to the mobile application testing platform.

In at least one of the various embodiments, test scripts may be uploaded independently of uploading the mobile application. Or, in at least one of the various embodiments, the mobile application testing platform may generate test scripts automatically based on an analysis of the uploaded mobile application.

At block 606, in at least one of the various embodiments, one or more eligible target mobile computers may be determined and the uploaded application may be deployed to one or more target mobile computers selected from among the eligible mobile computers. In at least one of the various embodiments, not every mobile computer included in the mobile computers test cloud may be relevant for testing any particular mobile application. In at least one of the various embodiments, for one or more reasons, one or more mobile computers may be incompatible with the uploaded mobile application. For example, a mobile application for Android based mobile computers may not be compatible with iOS based mobile computers so the iOS based mobile computers may be excluded from the list of relevant mobile computers.

Further, in at least one of the various embodiments, the set of eligible mobile computers may be further limited based on criteria provided by a user, or criteria associated with one or more characteristics of the uploaded mobile applications. See, FIG. 7 and its description for additional description regarding determining mobile computers for testing.

In at least one of the various embodiments, the uploaded mobile application may be downloaded/installed onto to the set of determined mobile computers. In at least one of the various embodiments, a testing control application, such as, testing control application 282 or 422, may install or deploy the mobile application to the determined mobile computers.

At block 608, in at least one of the various embodiments, one or more test runs for the uploaded application may be executed on each selected mobile computer. In at least one of the various embodiments, test runs that correspond to one or more test scripts may be executed for the uploaded mobile application. In at least one of the various embodiments, the tests may be ran individually on each of the determined mobile computers.

In at least one of the various embodiments, the test runs may be performed on actual physical instances of the selected mobile computers rather than being ran on or in emulators and/or simulators. The mobile computers used for testing are instances of the same mobile computers that various mobile carriers and/or manufacturers may make available to consumers. Thus, in at least one of the various embodiments, the test runs may be executed using the same hardware and software that are available to consumers.

At block 610, in at least one of the various embodiments, various metrics, including one or more metrics relating to, quality, performance, or the like, may be computed. Likewise, in at least one of the various embodiments, comparison data related to the various metrics may be computed as well. In at least one of the various embodiments, each individual client testing application may monitor one or more metrics for the mobile computer that it resides on. In at least one of the various embodiments, the client testing application may be arranged to monitor performance characteristic of the mobile. In some cases, client testing application may be arranged to monitor a base-line set of metrics as well as one or more metrics that may be specifically identified in the test script(s) that are being used.

In at least one of the various embodiments, the client testing application may report information related to the execution of the test(s) and/or the monitored metrics to the testing control application.

At block 612, in at least one of the various embodiments, test results may be displayed in one or more interactive reports and/or user interface displays. In at least one of the various embodiments, the testing control application may be arranged to use the test results collected by the client testing application to generate one or more reports. In at least one of the various embodiments, reports may be textual and/or graphical depending on the test scripts, the recorded metrics and measurements, user preference, configuration values, or the like.

Furthermore, in at least one of the various embodiments, testing results may trigger one or more notifications to be generated based on the operation of policy based rules. For example, a test run may be configured to email one or more users if more the 10 new defects were detected, or the like. Notifications may use various mechanisms, such as, email, SMS messages, user-interface alerts, or the like.

Next, in at least one of the various embodiments, control may be returned to a calling process.

Figure 7:
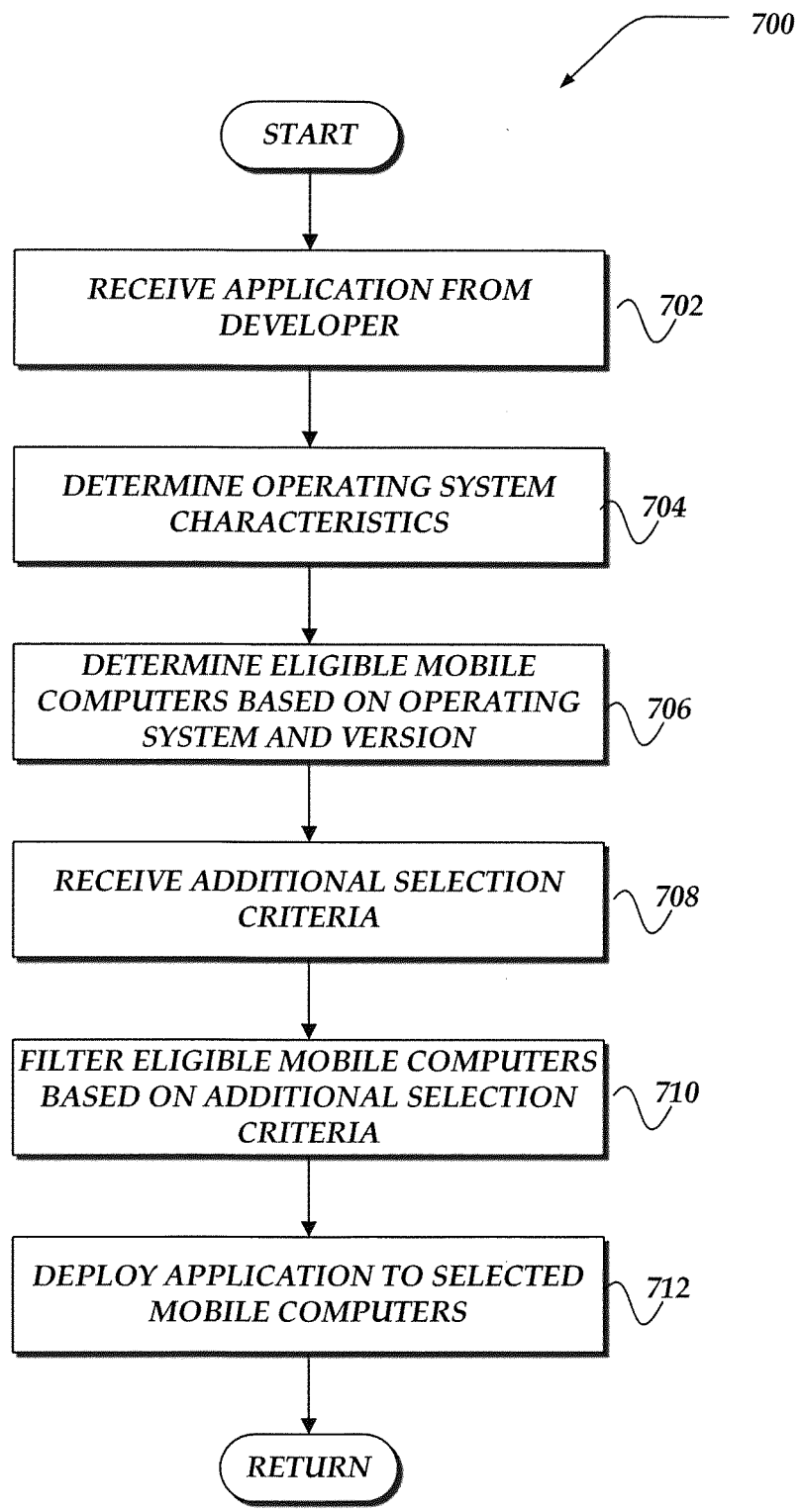
FIG. 7 shows a flowchart for a process for determining mobile computers for testing in a mobile application testing platform in accordance with at least one of the various embodiments.

FIG. 7 shows a flowchart for process 700 for determining mobile computers for testing in a mobile application testing platform in accordance with at least one of the various embodiments. After a start block, at block 702, in at least one of the various embodiments, a mobile application may be provided to the mobile application testing platform by a mobile application developer. In at least one of the various embodiments, the application may be provided over a wired or wireless network, such as, network 506.

At block 704, in at least one of the various embodiments, the operating system characteristics may be determined from the uploaded application. In at least one of the various embodiments, to determined eligible mobile computers, the mobile application may be analyzed to determine the one or more operating systems the mobile application may be compatible with. For example, application files may include well-known meta-data that indicates which operating system the application is targeted for. Such meta-data may also include information such as minimum operating system version, minimum and/or required hardware capabilities, or the like. Thus, the testing control application may extract this type of meta-data from the uploaded application files.

Also, in at least one of the various embodiments, a mobile application developer may provide information for the upload mobile application that may be used to determine the target operating system. For example, a mobile application developer may provide information to the mobile application testing platform that may restrict eligible mobile computers to those that may be running a particular operating system and/or a particular set of operating system versions.

At block 706, in at least one of the various embodiments, one or more eligible target mobile computers may be determined based on the characteristics of the operating system the application may be designed for. In at least one of the various embodiments, eligible target mobile computers may be determined based on various mobile computer criteria of the target mobile computers.

In at least one of the various embodiments, the testing control application may maintain a searchable database that includes information identifying the characteristics of each mobile computer. In other cases, in at least one of the various embodiments, the testing control manager may interrogate mobile computers to determine their operating system and version. In at least one of the various embodiments, the testing control application may interrogate the mobile computers by communicating over network to the client testing application that may be installed on each mobile computer. Alternatively, each client testing application may communicate its host computer's characteristics and attributes to the testing control application as needed, such as, after the mobile computer has rebooted or restarted, and so on.

At block 708, in at least one of the various embodiments, addition selection criteria may be received. In at least one of the various embodiments, any additional criteria may be provided by one or more users, such as, users associated with the mobile application developer that is testing the uploaded application. Also, in at least one of the various embodiments, administrative users of the mobile application testing platform may provide additional criteria for determining target mobile computers. Further, in at least one of the various embodiments, additional criteria may be retrieved from configurations files, or the like.

In at least one of the various embodiments, additional criteria may include market share requirements and/or minimums. For example, in at least one of the various embodiments, the mobile application developer may restrict eligible mobile computers to those having the top 20 market share. Also, in at least one of the various embodiments, market share criteria may be defined using worldwide numbers, a single country, multiple countries, or other geographic market information.

At block 710, in at least one of the various embodiments, eligible target mobile computers may be filtered based on any provided additional criteria information. In at least one of the various embodiments, this may result in a set of mobile applications for testing the application.

In at least one of the various embodiments, the testing control application may generate a report and display to a user the determined mobile computers. This may enable the user to review if the provided criteria may be correctly selecting the mobile computers for testing. In at least one of the various embodiments, the user may modify the criteria interactively changing the list of selected mobile computers.

At block 712, in at least one of the various embodiments, the application may be deployed the one or more selected target mobile computers. In at least one of the various embodiments, the mobile application (e.g., the necessary files for installing and running the application) may be deployed to the selected mobile computers and installed. Next, in at least one of the various embodiments, control may be returned to a calling process.

Figure 8:
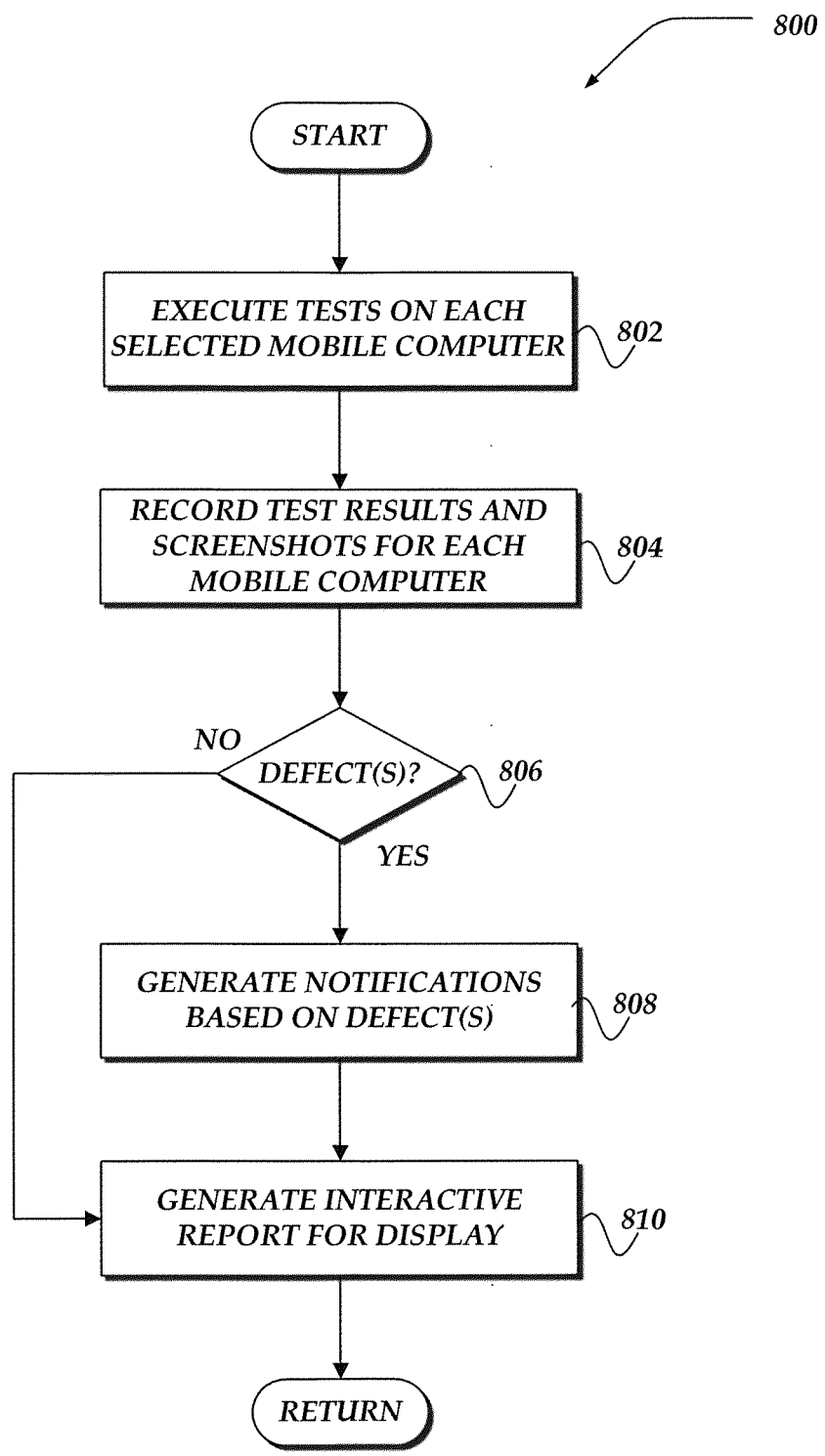
FIG. 8 shows a flowchart for a process for testing mobile applications using a mobile application testing platform in accordance with at least one of the various embodiments.

FIG. 8 shows a flowchart for process 800 for testing mobile applications using a mobile application testing platform in accordance with at least one of the various embodiments. After a start block, at block 802, in at least one of the various embodiments, one or more test runs may be executed on each selected target mobile computer.

At block 804, in at least one of the various embodiments, the test results with corresponding user-interface screenshots may be recorded for each target mobile computer. In at least one of the various embodiments, during the execution of test scripts, the client testing application (installed on each mobile computer) may acquire screenshots showing the state of the mobile computer's user-interface display. In at least one of the various embodiments, the screenshots may automatically be captured in conjunction with each step of the test run. Also, in at least one of the various embodiments, the test scripts may be arranged to include commands the expressly capture screenshots. For example, a test script may direct that a screenshot should be captured every 500 ms for the next 2 seconds, and so on. In at least one of the various embodiments, each screenshot may be tagged with the corresponding test step, test, application, or mobile computer.

In at least one of the various embodiments, one or more log files may be generated that record the outcome of each test step and or test for each mobile computer. In at least one of the various embodiments, log files may include a record of each function and/or system called by the mobile application, including parameters passed and return values returns. In come cases, such as, after a defect is detected, or after crashes, or the like, stack traces may be recorded in the log file.

At decision block 806, in at least one of the various embodiments, if the one or more test runs indicate that there may be defects in the mobile application being tested, control may flow to block 808; otherwise, in at least one of the various embodiments, control may flow to block 810.

At block 808, in at least one of the various embodiments, one or more notifications may be generated in response to the one or more defects being found during the test runs. In at least one of the various embodiments, depending on the severity and/or number of the defects discovered one or more notifications may be generated based on the operation of policy based rules. For example, a test run may be configured to email one or more users if more the 10 new defects were detected, or the like. Notification may use various mechanisms, such as, email, SMS messages, user-interface alerts, or the like.

At block 810, in at least one of the various embodiments, an interactive report may be generated and displayed to a user. In at least one of the various embodiments, such reports may be graphical using charts, graphs, and so on. Among other things, the reports may indicate which mobile computers generated defects during the test runs. Results may be sorted and/or grouped based on mobile computer type, manufacturer, wireless carrier, defect category (e.g., UI errors, data errors, system crashes, or the like), operating system version, or the like.

Next, in at least one of the various embodiments, control may be returned to a calling process.

Figure 9:
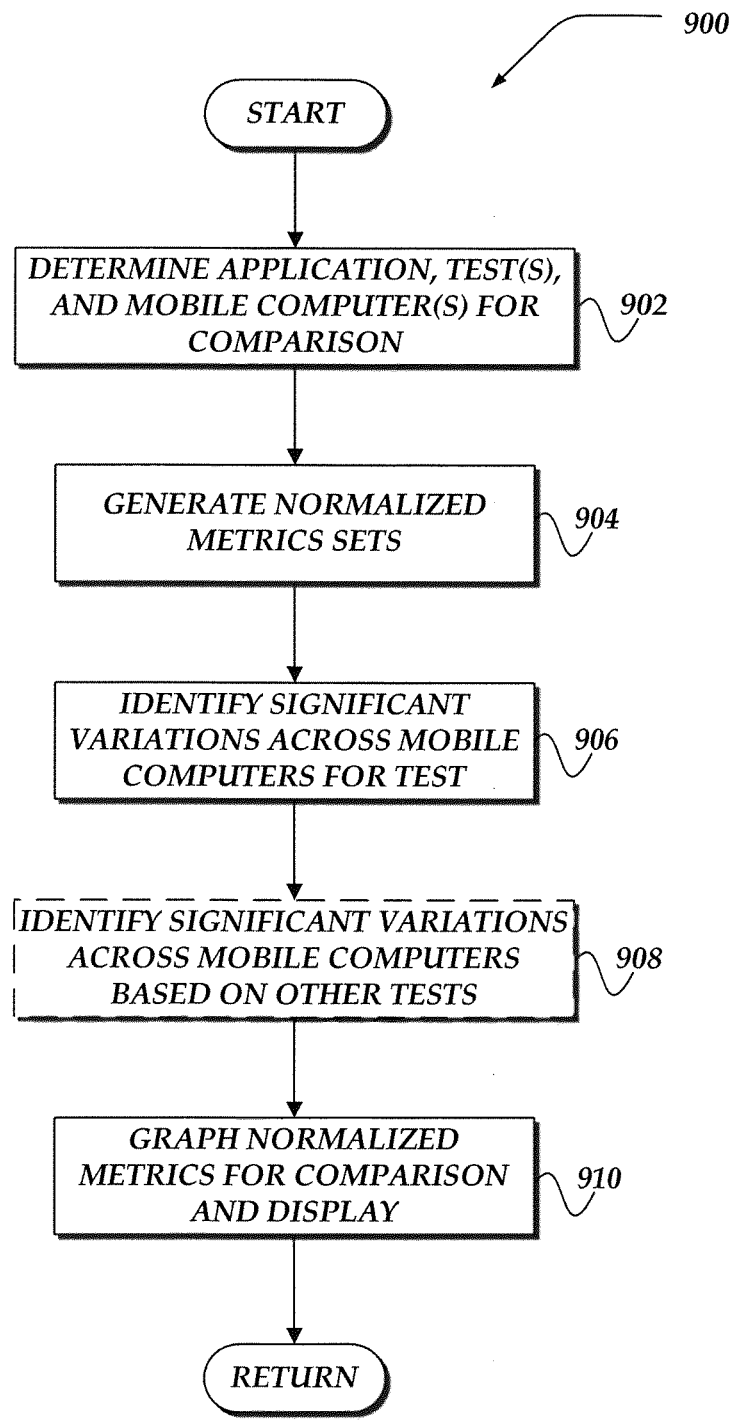
FIG. 9 shows a flowchart for a process for comparing test results using a mobile application testing platform in accordance with at least one of the various embodiments.

FIG. 9 shows a flowchart for process 900 for comparing test results using a mobile application testing platform in accordance with at least one of the various embodiments. After a start block, at block 902, in at least one of the various embodiments, one or more applications, test runs, mobile computers, operating systems, or the like, may be determined and/or selected for comparison.

In at least one of the various embodiments, users may designate that one or more result sets from various test runs for comparison. Results from different times, different mobile computers, different versions of an application, different applications, different operation system versions, or the like, or combination thereof, may be designated for comparison.

For example, in at least one of the various embodiments, users may wish to compare results from five consecutive test run results to determine if number of defects may be trending up or trending downward. Also, in at least one of the various embodiments, users may be interested comparing defect trends based on mobile computer types. For example, a user may want to compare metrics for smart phones and tablets to identify if the different device type may be significant.

At block 904, in at least one of the various embodiments, one or more normalized data sets may be generated from one or more of the metrics associated with the comparison criteria. In at least one of the various embodiments, raw data that was collected for each metric of interest may be normalized and/or processed to prepare it for comparison. Not every metric may benefit from normalization, in such cases, data for the metrics may be used as is.

At block 906, in at least one of the various embodiments, one or more significant deviations, if any, across the various different target mobile computers may be identified. In at least one of the various embodiments, the data for each designated metric may be analyzed to find significant deviations. For example, if defect rate for ten different mobile computers averages 10-15 defects but one mobile computer had 50 defects it may be flagged as a significant deviation. In at least one of the various embodiments, each deviation that may be detected may be tagged and/or stored for future reference.

At block 908, in at least one of the various embodiments, optionally, significant deviations, if any, across various target mobile computers based and other applications and/or test may be identified. In at least one of the various embodiments, users may be interested in analyzing and metrics associated with one application with another. In at least one of the various embodiments, a user may be interested observing how the application they are currently testing compares with other applications that have been tested on the mobile application test platform. For example, a user may compare the defect counts for one application with another. Accordingly, in at least one of the various embodiments, the data for each designated metric may be analyzed to find significant deviations. In at least one of the various embodiments, each deviation that may be detected may be tagged and/or stored for future reference.

At block 910, in at least one of the various embodiments, graphs of one or more of the normalized metrics may be presented to a user for comparison. In at least one of the various embodiments, various graphical representations may be presented to a user to visualize the comparison results. In at least one of the various embodiments, metrics may be compared with results from other test runs, mobile computers, applications, or the like. Also, in at least one of the various embodiments, metrics for a test run may be compared (e.g., plotted) against an arbitrary baseline, such as, defects versus test step, and so on. In at least one of the various embodiments, one or more visualizations, such as, pie charts, scatter plots, heat-maps, line graphs, bar graphs, time-lines, histograms, stem plots, Pareto diagrams, or the like, may be generated. Next, in at least one of the various embodiments, control may flow to a calling process.

Figure 10:
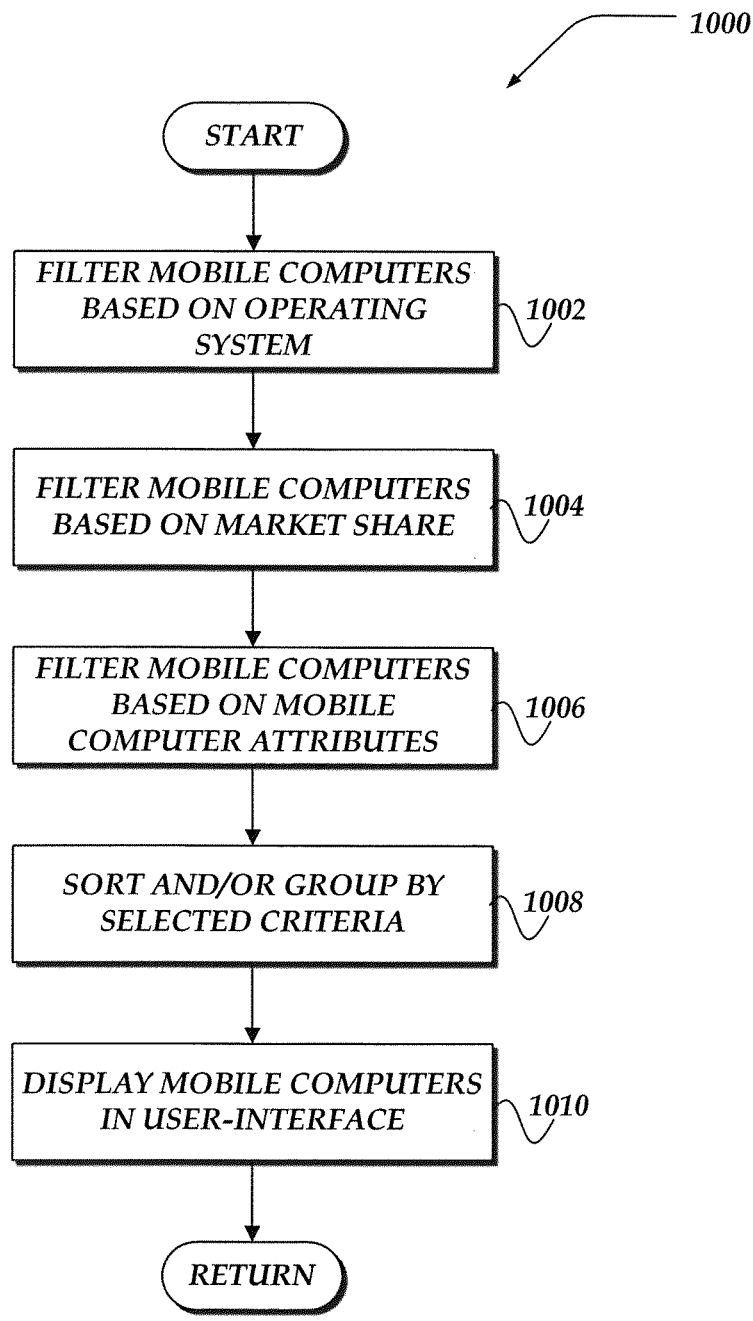
FIG. 10 shows a flowchart for a process for filtering mobile computers associated with a mobile application testing platform in accordance with at least one of the various embodiments.

FIG. 10 shows a flowchart for process 1000 for filtering mobile computers that are part of a mobile application testing platform in accordance with at least one of the various embodiments. In at least one of the various embodiments, at various time the mobile application test platform may filter the mobile computers to produce a subset of mobile computers for testing. After a start block, at block 1002, in at least one of the various embodiments, mobile computers may be filtered based on operating system type. In at least one of the various embodiments, the testing control application may analyze the operating system and/or operating system version of each available mobile computer. Mobile computers that fail to meet the operating system criteria may be removed from the list of eligible mobile computers for the current test and/or report.

In at least one of the various embodiments, operating system criteria may be derived from the uploaded mobile application files (e.g., Android versus iOS applications). For example, the meta-data included with an uploaded mobile application may indicate at least some criteria for filtering the mobile computers based on the operating system, such as, the file extensions of the uploaded applications, or the like.

Also, in at least one of the various embodiments, users may directly provide operating system criteria to employ in the filter. For example, a user may want to limit a test run to mobile computers running a particular version of an operating system. Thus, in at least one of the various embodiments, dynamic user interfaces may be employed to provide criteria choices that may adapt to be relevant to the current circumstance. For example, if the application being tested is an iOS application, the testing control application may dynamically generate user interfaces that include iOS versions for adding as additional operating system criteria.

In at least one of the various embodiments, mobile computers available to the mobile application test platform may have various identifiable versions of common mobile applications installed on. In particular, these may be other mobile applications that may interact with the mobile application being tested may be exposed for filtering. Thus, in at least one of the various embodiments, a user may filter mobile computers based on the particular version and/or maker of various installed mobile applications, such as, web browsers, messaging applications, mapping/navigation application, contact managers, camera/photo/video applications, email clients, social networking clients, or the like. For example, a user may generate a filter to include Samsung™ smart phones running recent versions of Android Operating System™ that have a particular VOIP client installed (e.g.,. Skype™). In at least one of the various embodiments, this functionality enables the mobile application testing platform to perform test runs that may be designed to test for interactions between various other installed mobile applications and the mobile application being tested.

In at least one of the various embodiments, since mobile carriers and/or network providers may offer customized/modified versions of mobile computers to their respective consumers, the mobile carrier may be added to a filter as well. This enables a mobile application developer to test applications on the mobile computers provided by different carriers and take appropriate actions if defects related to differences between mobile carriers and/or mobile carrier provided mobile computers may be discovered.

At block 1004, in at least one of the various embodiments, mobile computers may be filtered based on market share for each different mobile computer. In at least one of the various embodiments, market share information for some or each mobile computer may be available to the testing control manager. Accordingly, in at least one of the various embodiments, mobile computers may be filtered from the eligible subset if their corresponding market share may be below a threshold value. Likewise, in at least one of the various embodiments, a filter may be arranged to include mobile computers in the eligible subset if their corresponding market share may be above a threshold value. For example, a user may be interested in testing mobile computers that may be in the top-twenty mobile computers in terms of market share. In this case, the testing control application may filter the mobile computer such that the twenty mobile computers with the highest market share may be included.

In at least one of the various embodiments, market share may be tracked on a market region basis, such as, by country (e.g., United States vs. South Korea), continent (e.g., Europe vs. South America), or the like. Also, in at least one of the various embodiments, market share for mobile computers may be tracked based on user demographics, such as, gender, age, income, home owner, or the like. Thus, in at least one of the various embodiments, the testing control application may enable a user to filter mobile computers such that the twenty mobile computers with the highest market share among home owner in the United States may be included in the mobile computer subset.

In at least one of the various embodiments, the mobile application testing platform may be arranged and/or configured to receive market share data from one or more data providers that may specialize in collecting and disseminating such information. Also, in at least one of the various embodiments, a mobile application developer may provide market share information that may be tailored to one or more of the applications they may be testing. For example, the mobile application developer may have data that indicated market share information for consumer who have used the application (or previous versions).

In at least one of the various embodiments, market share information may be provided using one or more well-known streaming communication mechanisms, or Internet protocols, where the data may be pulled by the testing control application from one or more sources. Also, such market share data may be uploaded from physical media such as CD-ROMs, or the like. In at least one of the various embodiments, the market share data may be received and/or converted to one or more data formats, such as, extensible markup language (XML), comma separated values (CSV), JavaScript object notation (JSON), or the like.

At block 1006, in at least one of the various embodiments, further, mobile computers may be filtered based on one or more mobile computer criteria and/or characteristics of the mobile computers, or the like, or combination thereof. In at least one of the various embodiments, criteria may be provided in exact values and/or ranges. For example, a filter may be designed to include (or exclude) mobile computers that have screen widths of four inches to five inches.

At block 1008, in at least one of the various embodiments, the remaining mobile computers may be sorted and/or grouped based on selected criteria. In at least one of the various embodiments, if the filters, if any, have been applied, the remaining mobile computers may be sorted based on the used to filter the mobile computers (e.g., market share). Also, in at least one of the various embodiments, other criteria may be provided for sorting independent of the filtering criteria. For example, the mobile computers may be filtered based on market share, but sorted based on pixel count of the mobile computer screens.

Likewise, in at least one of the various embodiments, mobile computers may be grouped by other criteria independent from the filtering action. For example, a set of mobile computers may be filtered such that they have the same operating system version may be grouped based on the manufacturer of the mobile computers.

At block 1010, in at least one of the various embodiments, the resulting set of mobile computers may be displayed in user interface, such as, a grid view. Next, in at least one of the various embodiments, control may be returned to a calling process.

Figure 11:
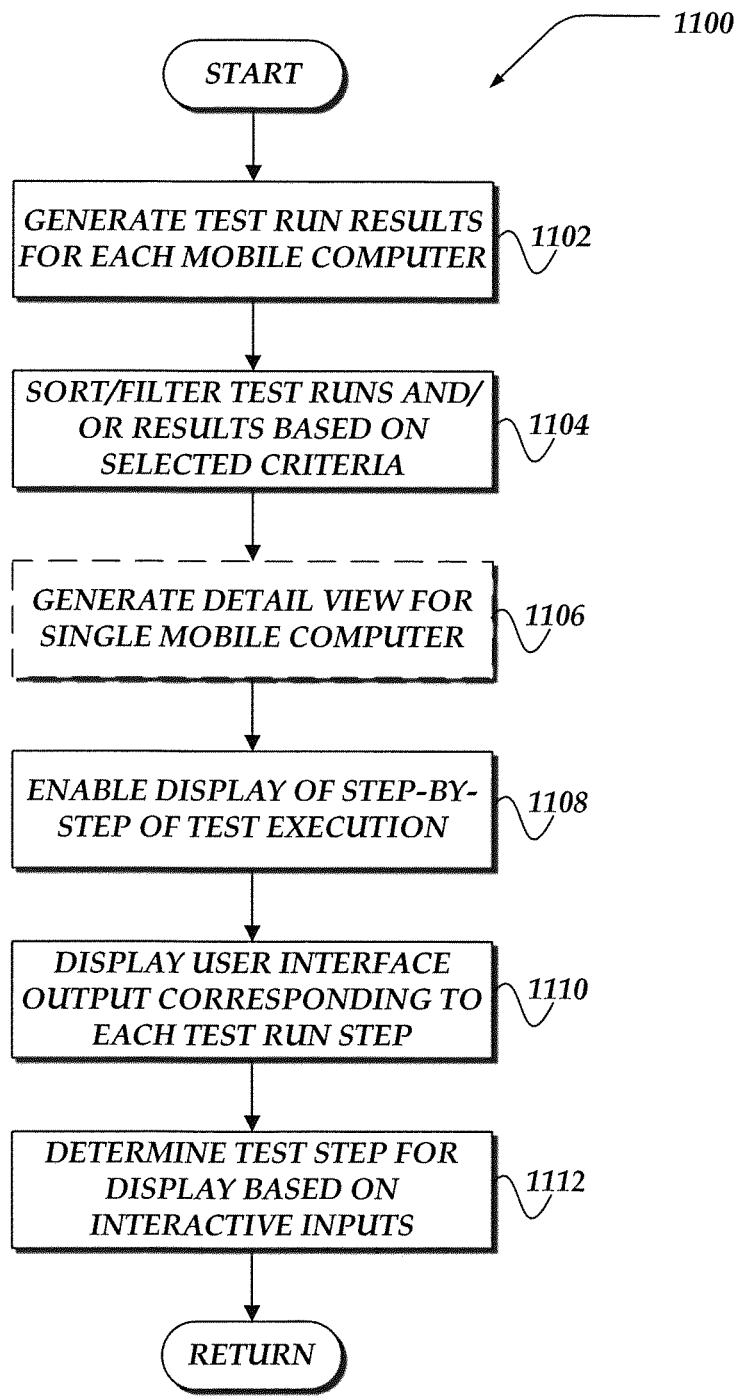
FIG. 11 shows a flowchart for a process for executing test runs and generating results on a mobile application testing platform in accordance with at least one of the various embodiments.

FIG. 11 shows a flowchart for process 1100 for executing test runs and generating results on a mobile application testing platform in accordance with at least one of the various embodiments. After a start block, at block 1102, in at least one of the various embodiments, test run results may be generated for each target mobile computer. In at least one of the various embodiments, test scripts may be drive the client testing application installed on each mobile computer involved in the test run to perform a sequence of actions. For each test step for each mobile computer the success or failure of each step may be recorded. Such records may be stored in a log file, database, or the like.

At block 1104, in at least one of the various embodiments, the test runs and/or the generated results of test runs may be sorted and/or filtered based on various selected criteria. In at least one of the various embodiments, common criteria may be to sort the results based on run order. In some cases, the results may be sorted based on defects, such as the number of mobile computers that failed the test, or the severity of discovered defects, or the like.

At block 1106, in at least one of the various embodiments, optionally, a detail view for a single selected target mobile computer may be displayed. Alternatively, in at least one of the various embodiments, a grid view that may include multiple target mobile computers may be displayed.

In at least one of the various embodiments, screenshot for each mobile computer that was tested may be displayed in a display such as a grid view. In some case, it may be advantageous to display a single mobile computer selected from among the set of tested mobile computers. In this case, screenshots corresponding to the single selected mobile computer may be displayed. Also, in at least one of the various embodiments, in single mobile computer display mode, one or more characteristics of the single mobile computer may be displayed in a detail display. For example, if a single mobile computer is selected for display, the detail display may show the device name, device brand, operating system and version, screen resolution, screen size, memory, release year, market share information, or the like.

At block 1108, in at least one of the various embodiments, step-by-step display of the execution and results of the test runs may be enabled. In at least one of the various embodiments, each test may include one or more test steps. For example, a test for testing user login, may include multiple test steps, such as, show login screen, enter username, enter password, press submit button, or the like.

At block 1110, in at least one of the various embodiments, user interface/screenshots corresponding to active test step may be displayed concurrent with the current selected test step. In at least one of the various embodiments, since a screenshot may be stored for each test step for each test mobile computer, the testing control application may display the screenshots that correspond to the current test step that may be highlighted.

In at least one of the various embodiments, if a single mobile computer is being viewed, the screenshot for that mobile computer may be shown. Also, in at least one of the various embodiments, if additional metrics were collected, such as, memory consumption, one or more of these values may be displayed as well. If multiple mobile computers may be viewed, the screenshot corresponding to the current test step for each mobile computer may be displayed.

At block 1112, in at least one of the various embodiments, the test step being viewed may be determined based on one or more inputs provided by a user. In at least one of the various embodiments, the testing control application may provide a user interface that enables a user to step back and forth between test steps.

In at least one of the various embodiments, since information regarding the completed test run for each mobile computer is recorded, users may be enabled to "browse" back and forth through the tests and test steps. As each test and/or test step may be visited the screenshots corresponding to the current test and/or test step may be displayed. Next, in at least one of the various embodiments, control may be returned to a calling process.

Figure 12:
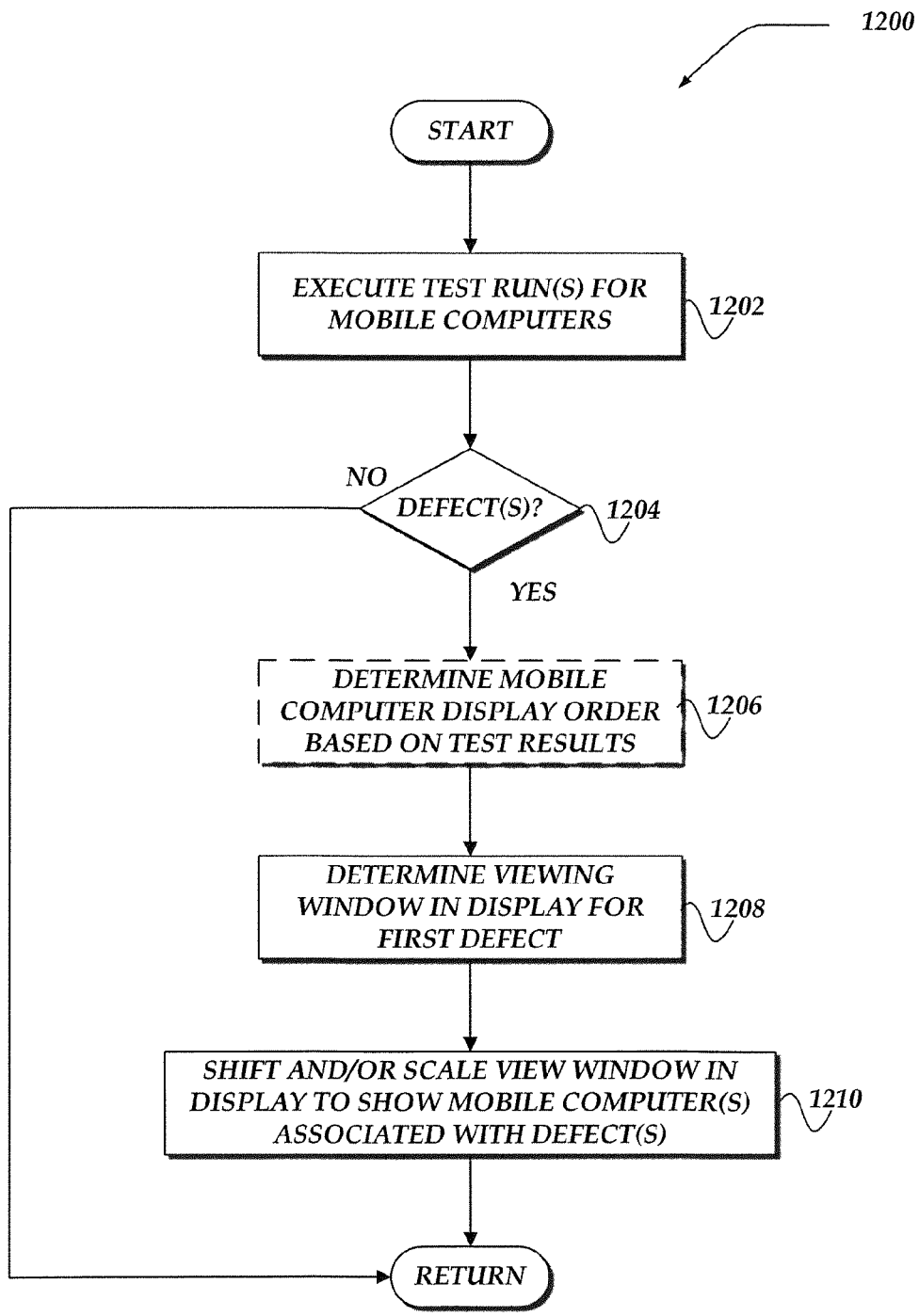
FIG. 12 shows a flowchart for a process for displaying mobile computers associated with significant events after a test run on a mobile application testing platform in accordance with at least one of the various embodiments.

FIG. 12 shows a flowchart for process 1200 for displaying mobile computers associated with significant events after a test run on a mobile application testing platform in accordance with at least one of the various embodiments. After a start block, at block 1202, in at least one of the various embodiments, one or more test runs may be executed for each target mobile computer.

At decision block 1204, in at least one of the various embodiments, if defects were found in a test run, control may flow to block 1206; otherwise, in at least one of the various embodiments, control maybe returned to a calling process.

At block 1206, in at least one of the various embodiments, optionally, the display order for the target mobile computers may be determined based on the test results. For example, mobile computers that may be associated with defects uncovered in the test runs may be sorted such that they are grouped together. Further, in at least one of the various embodiments, additional sorting and filtering criteria may be employed, such as, those described in conjunction with FIG. 10.

At block 1208, in at least one of the various embodiments, a viewing window for the display may be determined based on the first defect that may have been determined. In at least one of the various embodiments, the viewing window may be determined using one or more well-known techniques inherent in the user-interface frameworks employed by the testing control application. For example, an API may be provided to compute the viewable display area for the mobile computers.

At block 1210, in at least one of the various embodiments, the user interface display may be dynamically shifted and/or scaled to show target mobile computers that may be associated with one or more defects. Next, in at least one of the various embodiments, control may be returned to a calling process.

Figure 13:
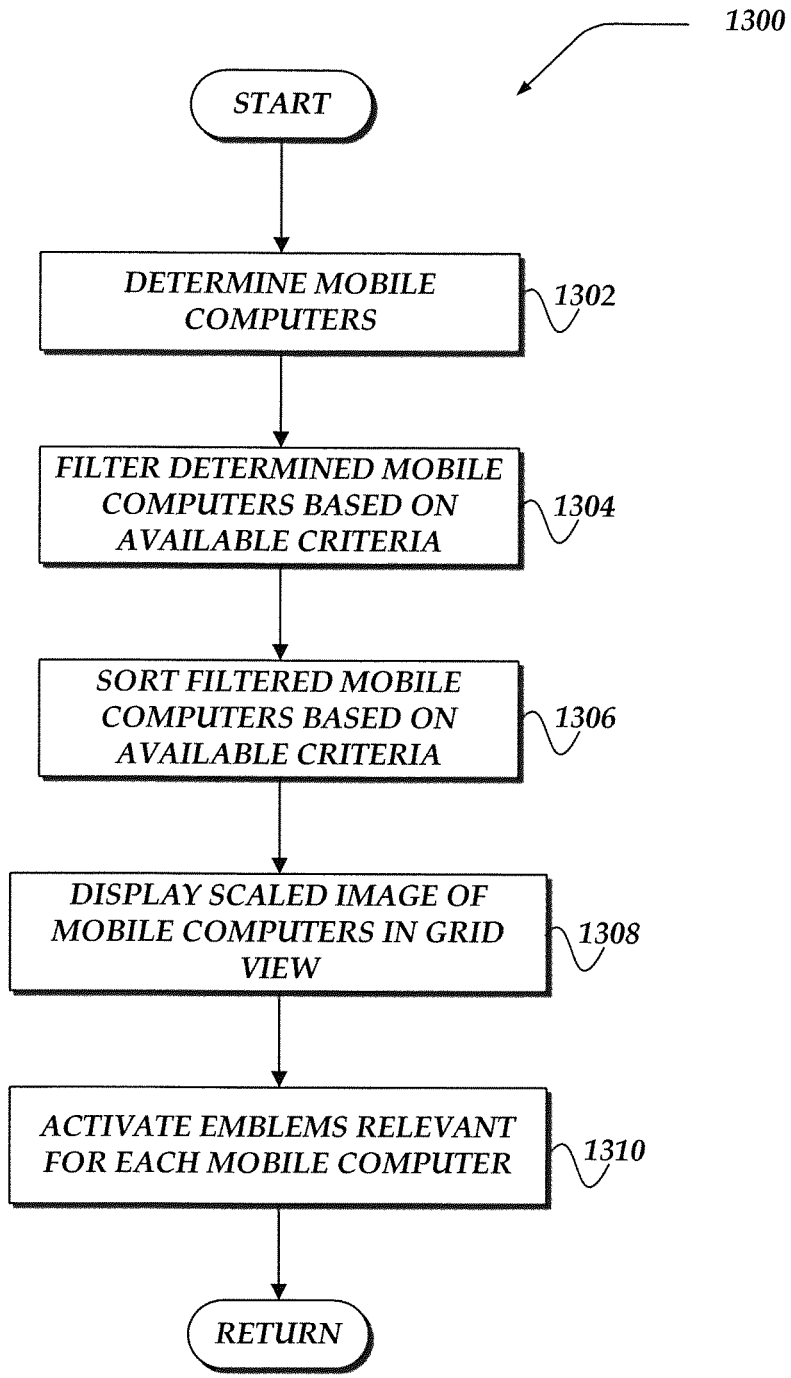
FIG. 13 shows a flowchart for a process for generating and displaying a grid view of mobile computers for a mobile application testing platform in accordance with at least one of the various embodiments.

FIG. 13 shows a flowchart for process 1300 for generating and displaying a grid view of mobile computers for a mobile application testing platform in accordance with at least one of the various embodiments. After a start block, at block 1302, in at least one of the various embodiments, one or more mobile computers may be determined for displaying in a grid view.

At block 1304, in at least one of the various embodiments, the one or more determined mobile computers may be filtered based on criteria made available and/or provided to process 1300. In at least one of the various embodiments, the testing control application may be arranged to employ filtering and sorting techniques, such as, those described in conjunction with FIG. 10.

At block 1306, in at least one of the various embodiments, the filtered mobile computers may be sorted and/or ordered based on other criteria made available and/or provided to process 1300. In at least one of the various embodiments, the testing control application may be arranged to employ filtering and sorting techniques, such as, those described in conjunction with FIG. 10.

At block 1308, in at least one of the various embodiments, scaled images of the resulting mobile computers may be displayed in a grid view. In at least one of the various embodiments, to facilitate viewing of the mobile computers, screenshots for each visible mobile computer scaled to relative size may be displayed in grid view. In at least one of the various embodiments, the testing control application may generate scrollbars or other similar user-interface elements that enable users to scroll horizontally and vertically to view mobile computer screenshots that may be out of view.

At block 1310, in at least one of the various embodiments, one or more emblems indicating defects or other significance factors may be activated and displayed on the relevant images of the displayed target mobile computer. Next, in at least one of the various embodiments, control may be returned to a calling process.

Figure 14:
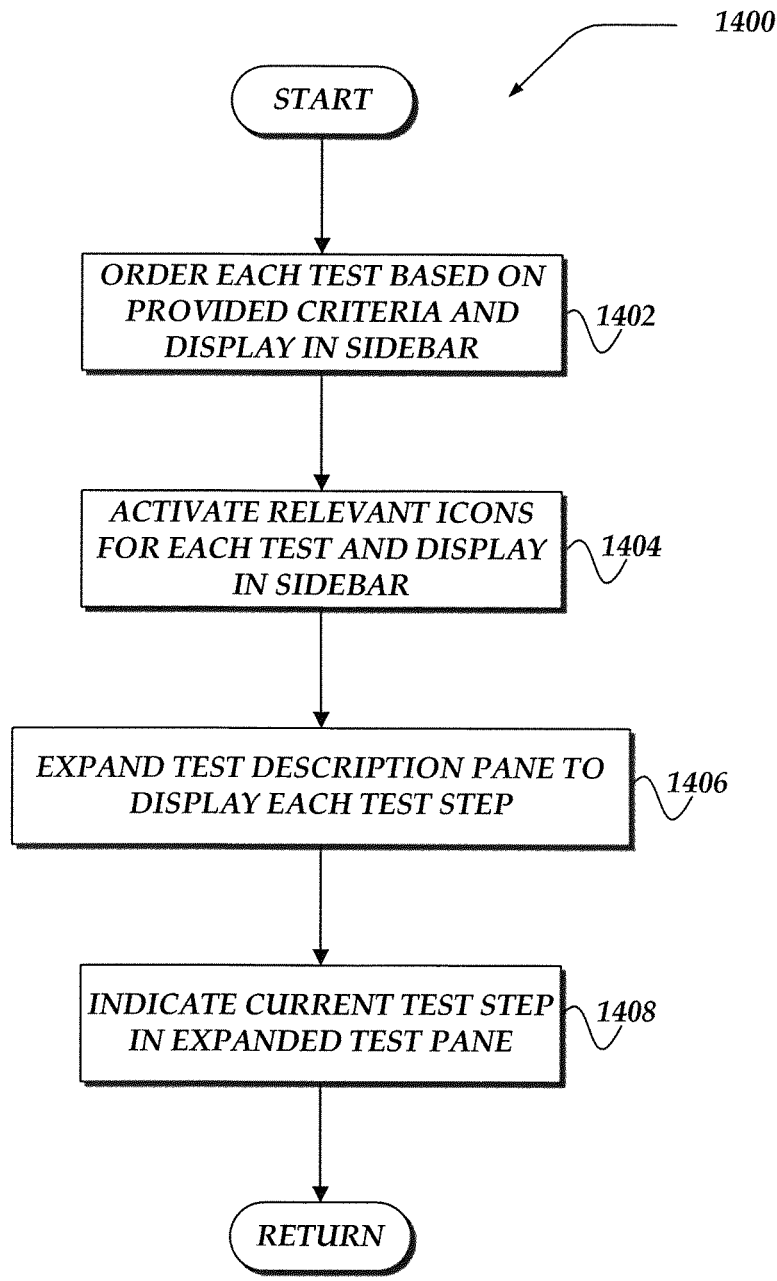
FIG. 14 shows a flowchart for a process for generating and displaying test run information in a sidebar display for a mobile application testing platform in accordance with at least one of the various embodiments.

FIG. 14 shows a flowchart for process 1400 for generating and displaying test run Information in a sidebar display for a mobile application testing platform in accordance with at least one of the various embodiments. After a start block, at block 1402, in at least one of the various embodiments, each test may be ordered and/or sorted based on criteria provided by a user or other configuration source. Further, the tests may be displayed in the determined sorted order in a sidebar pane (user-interface window) such that a label and/or description may be visible for each test and displayed with one row per test.

In at least one of the various embodiments, if the number of tests exceeds the available viewing area, well-known user-interface techniques such as scrolling may be activated to enable a user to view the tests that may otherwise be out of view.

At block 1404, in at least one of the various embodiments, one or more icons and/or badges representing the state and/or status of the tests may be activated and displayed in the sidebar. In at least one of the various embodiments, particular user interface elements, such as, icons, emblems, colors, animations, or the like, may be generated as attached and/or embedded with the user interface row that is showing the test information.

At block 1406, in at least one of the various embodiments, responsive to user inputs, the test descriptions may be expanded into a test detail view pane that shows each test step comprising the test. In at least one of the various embodiments, a user may click on a sidebar row enabling the sidebar row to expand and show each test step that may comprise the selected test.

At block 1408, in at least one of the various embodiments, the current test step may be indicated in the expanded test detail view. In at least one of the various embodiments, the testing control application may be arranged to employ one or more user interface techniques to indicate which test step is active. For example, the active test step may be bolded or otherwise emphasized to indicate that it is active. The active test step may correspond to the screenshots and/or metrics may be displayed in other parts of the user-interface. Further, a user may select, or click on or near the test row to cancel the expanded view which may hide the test steps for that row from view. In at least one of the various embodiments, multiple test rows may be expanded, each showing their associated test step. Next, in at least one of the various embodiments, control may be returned to a calling process.

Figure 15:
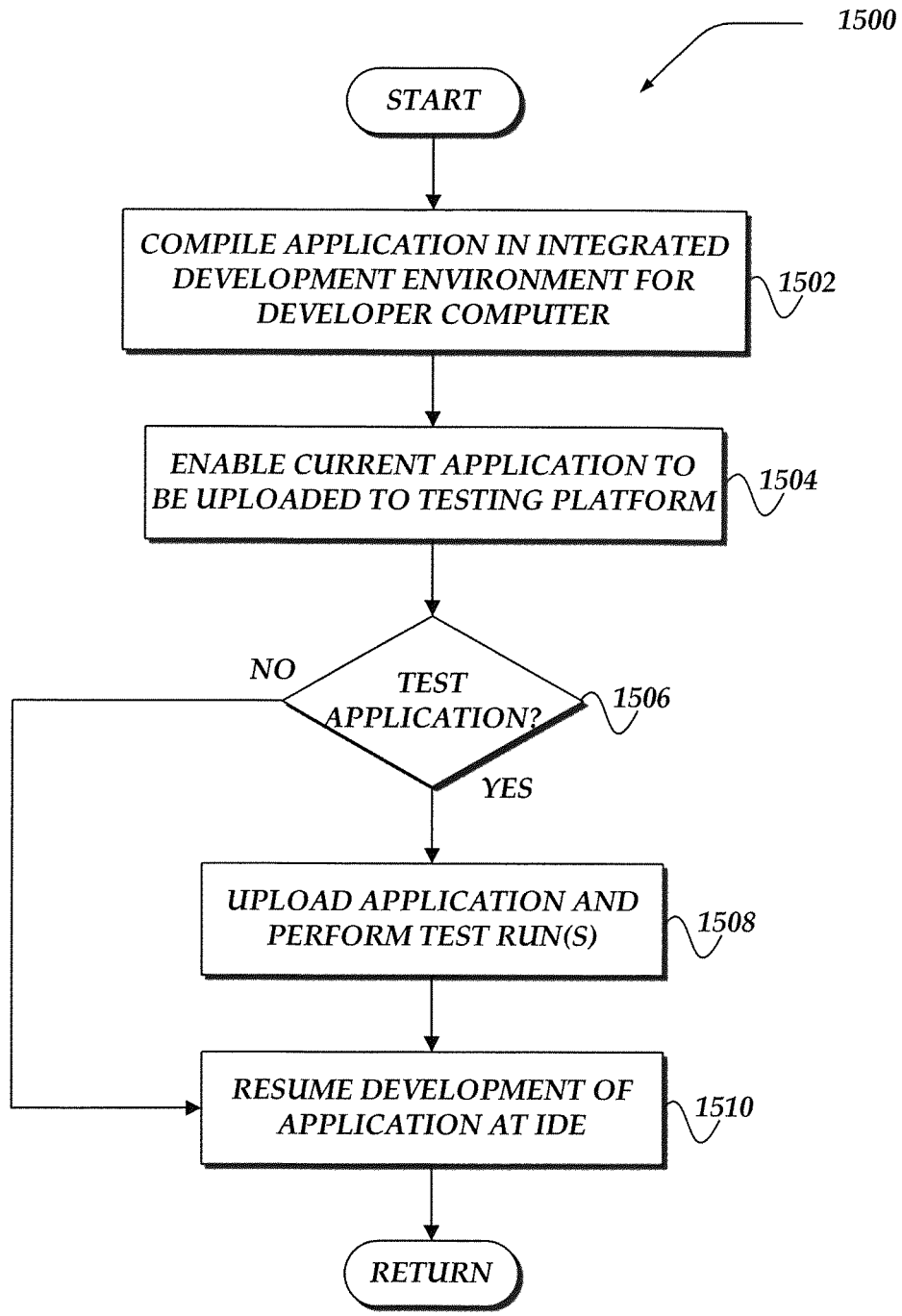
FIG. 15 shows a flowchart for a process for integrating an integrated development environment (IDE) with a mobile application testing platform in accordance with at least one of the various embodiments.

FIG. 15 shows a flowchart for process 1500 for integrating a mobile application developer IDE with a mobile application testing platform in accordance with at least one of the various embodiments. After a start block, at block 1502, in at least one of the various embodiments, a mobile application under development may be compiled from within an integrated development environment (IDE) by a mobile application developer. IDEs enable mobile application developer to have convenient access to developer tools, such as, compilers, linkers, code editors, debuggers, GUI builders, documents (e.g., language reference, operating system references, programming guides, or the like), packaging tools, or the like. In at least one of the various embodiments, IDEs may enable mobile application developers to perform most of the actions necessary for creating and packaging application using a single unified development environment.

At block 1504, in at least one of the various embodiments, the current mobile application may be arranged to enable it to be uploaded to the mobile application test platform. In at least one of the various embodiments, the testing control application may be arranged to enable direct integration with an IDE. In at least one of the various embodiments, this may be enabled by GUI menu link, button, or the like, that may activate the mobile application testing platform.

In at least one of the various embodiments, the integration may be enabled by arranging the IDE to activate one or more UI elements for the mobile application testing platform if the relevant services may be available. In at least one of the various embodiments, the IDE may detect that a mobile application testing platform is active and available by communicating over a defined network channel (e.g., TCP/UDP port). Also, in at least one of the various embodiments, the IDE may retrieve information from a configuration file, or the like, that indicates a mobile application testing platform may be available.

At decision block 1506, in at least one of the various embodiments, if the application is to be uploaded for testing, control may flow to block 1508; otherwise, in at least one of the various embodiments, control may flow to block 1510. In at least one of the various embodiments, if a mobile application testing platform maybe available, the IDE may activate/enable a UI element if the mobile application under develop-ment is in a testable state. For example, if the mobile application developer has used the IDE to build in an application without compile or linking errors a UI element, such as, a menu link may be activated.

At block 1508, in at least one of the various embodiments, the mobile application may be uploaded to the mobile application testing platform and one or more test runs may be executed for the uploaded mobile application.

At block 1510, in at least one of the various embodiments, the mobile application may be arranged in the IDE such that the mobile application developer may resume developing the application.

Next, in at least one of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Illustrative Use Cases

FIGS. 16-23 represent user interfaces use cases for a mobile application testing platform in accordance with at least one of the various embodiments. In at least one of the various embodiments, user interfaces other than those represented in FIGS. 16-23 may be employed without departing from the spirit and/or scope of the claimed subject matter. Such user interfaces may have more or fewer user interface elements which may be arranged in various ways. In some embodiments, user interfaces may be generated using web pages, desktop applications, mobile applications, or the like. In at least one of the various embodiments, testing control application 282, testing control application 422 may include module, processes and/or API's for enabling the generation of user interfaces, such as, those represented in FIGS. 16-23.

Furthermore, FIG. 24 shows an example of a portion of a test script in accordance with at least one of the various embodiments.

Figure 16:
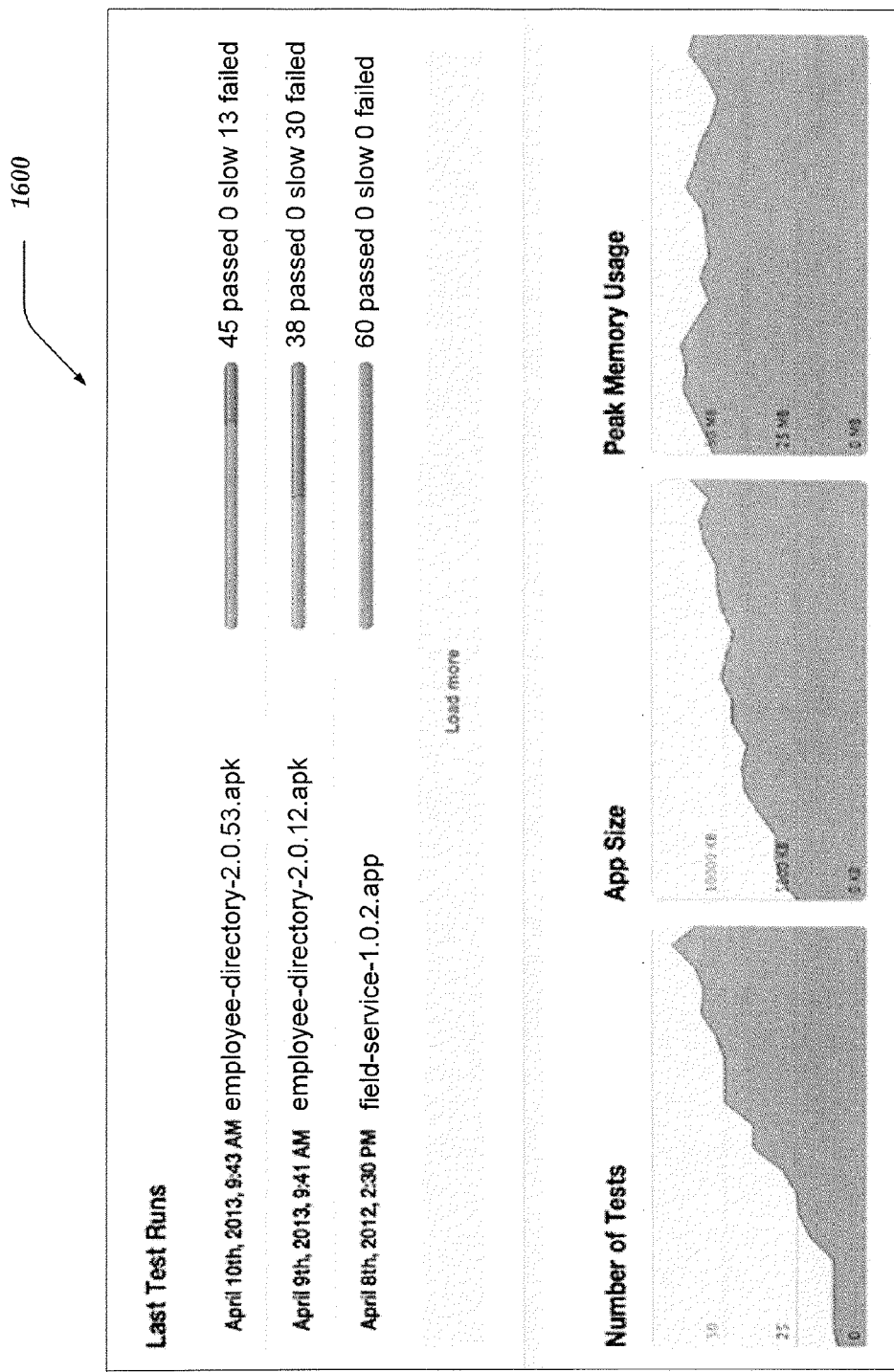
FIGS. 16-23 illustrate user interfaces for mobile application testing in accordance with at least one of the various embodiments.

FIG. 16 illustrates dashboard 1600 that may be employed for a mobile application testing platform, in accordance with at least one of the various embodiments. In at least one of the various embodiments, dashboard 1600 may be generated and presented to a user that is visiting the mobile application testing platform. Dashboard 1600 includes various graphs that may provide the user immediate feedback regarding the status of mobile applications with respect to testing. In at least one of the various embodiments, in additional various graphs, the dashboard may show a list of the latest test runs that were performed along with a summary each runs results. In at least one of the various embodiments, a user may limit the access to dashboard 1600 using well-known techniques such as password protected user accounts, or the like.

Figure 17:
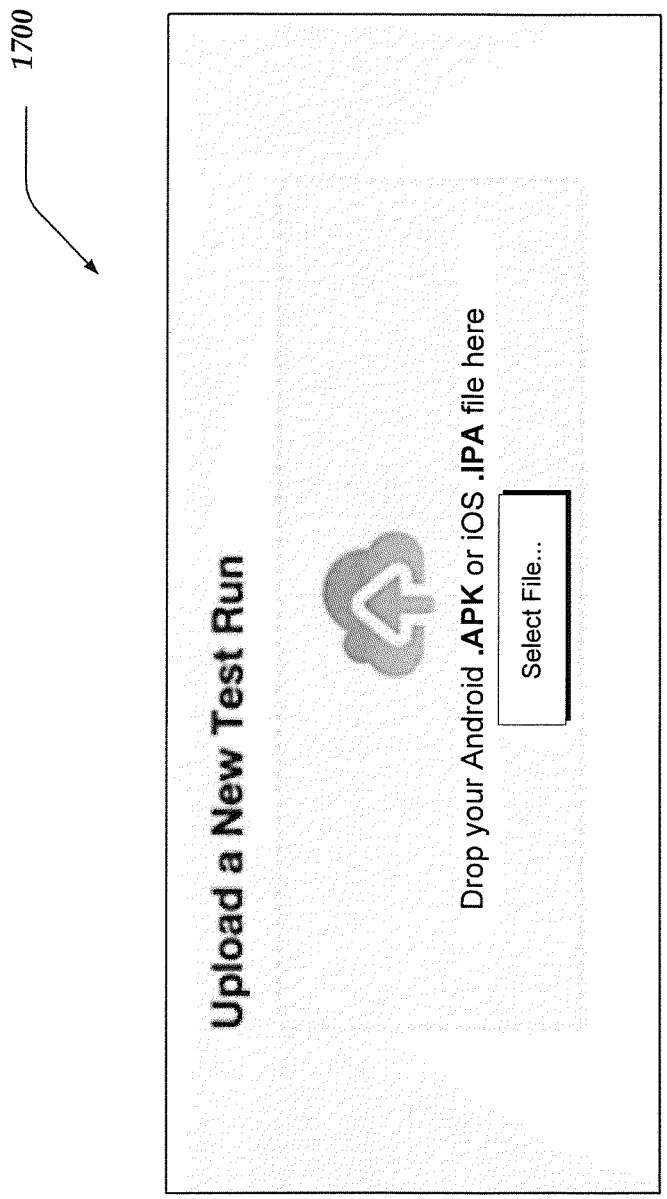

FIG. 17 illustrates interface 1700 that may be employed for a mobile application testing platform, in accordance with at least one of the various embodiments. In at least one of the various embodiments, the mobile application testing platform may enable users (e.g., mobile application developers) to upload one or more mobile applications for testing. For example, interface 1700 illustrate an interface that may be generated and provide to user for uploading mobile applications. In this example, the user is prompted to drag and drop application files onto the user interface. Alternatively, in the examples, the user may press a "Select File . . . " button to open a file selection dialog box to pick the file(s) for uploading to the mobile application testing platform.

Figure 18:
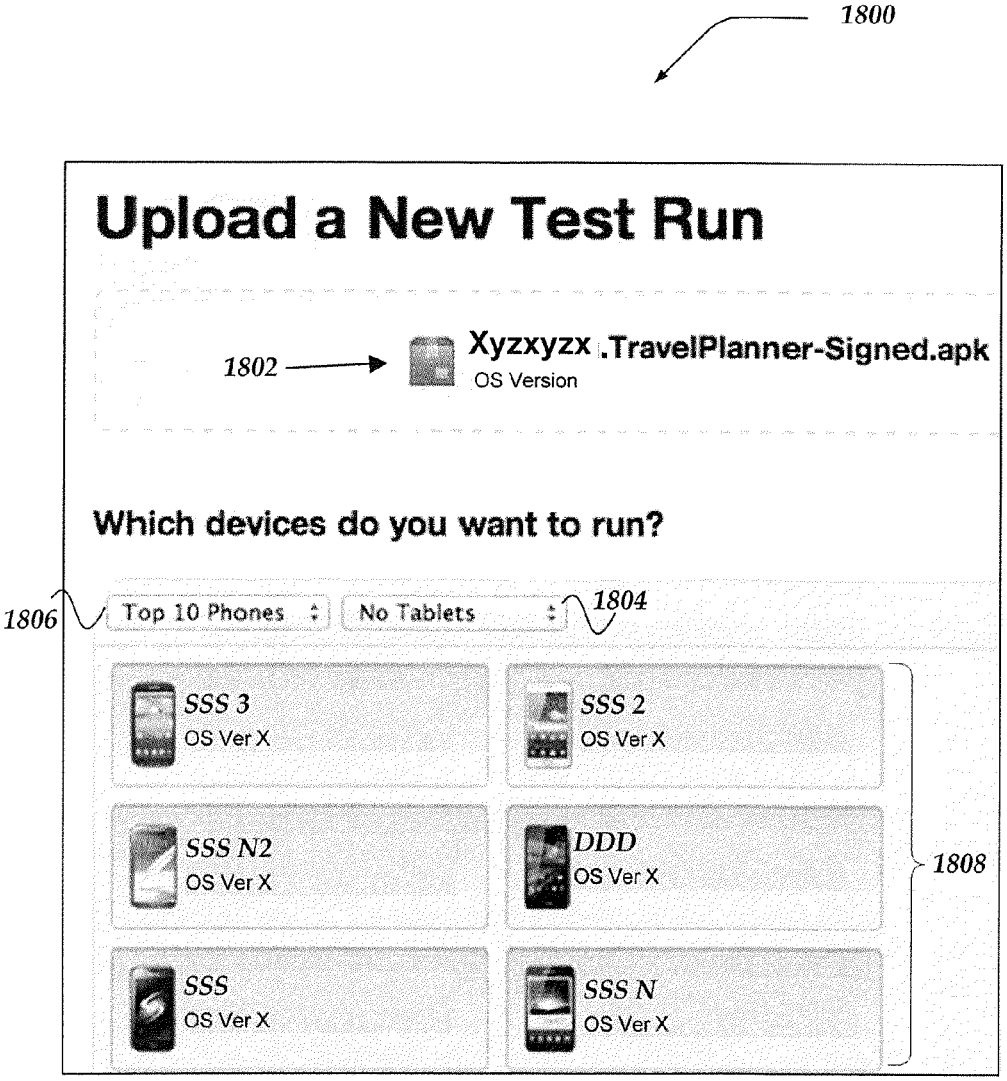

FIG. 18 illustrates interface 1800 that may be employed to determine the mobile computers for a test run in accordance with a least one of the various embodiments. In at least one of the various embodiments, in this example, label 1802 includes the file name of the mobile application that the test run is targeted for. Also, in at least one of the various embodiments, interface 1800 may include input elements for providing criteria for filtering mobile computers for the test run. In this example, drop down list 1806 may enable a user to select various criteria to select mobile computer, here the criteria of "Top 10 Phones" has been selected. Likewise, in this example, dropdown list 1804 enables additional criteria, such as, "No tablets," to be provided for filtering mobile computers.

In at least one of the various embodiments, as criteria is being provided for filtering mobile computers, interface 1800 may dynamically display images of the mobile computers presently matching the accumulation of provided criteria. In this example, mobile computers 1808, represent mobile computers that may be consistent with current provide filtering criteria. Note, in at least one of the various embodiments, interface 1800 may be arranged to include a scrollable user interface element to display mobile computers that may be hidden out of view. Further, a user may be guided in selecting filters based on how the mobile computer name (brand name), operation system w/version, and/or a photo-realistic image of the mobile computer face, that may be shown in interface 1800.

Figure 19:
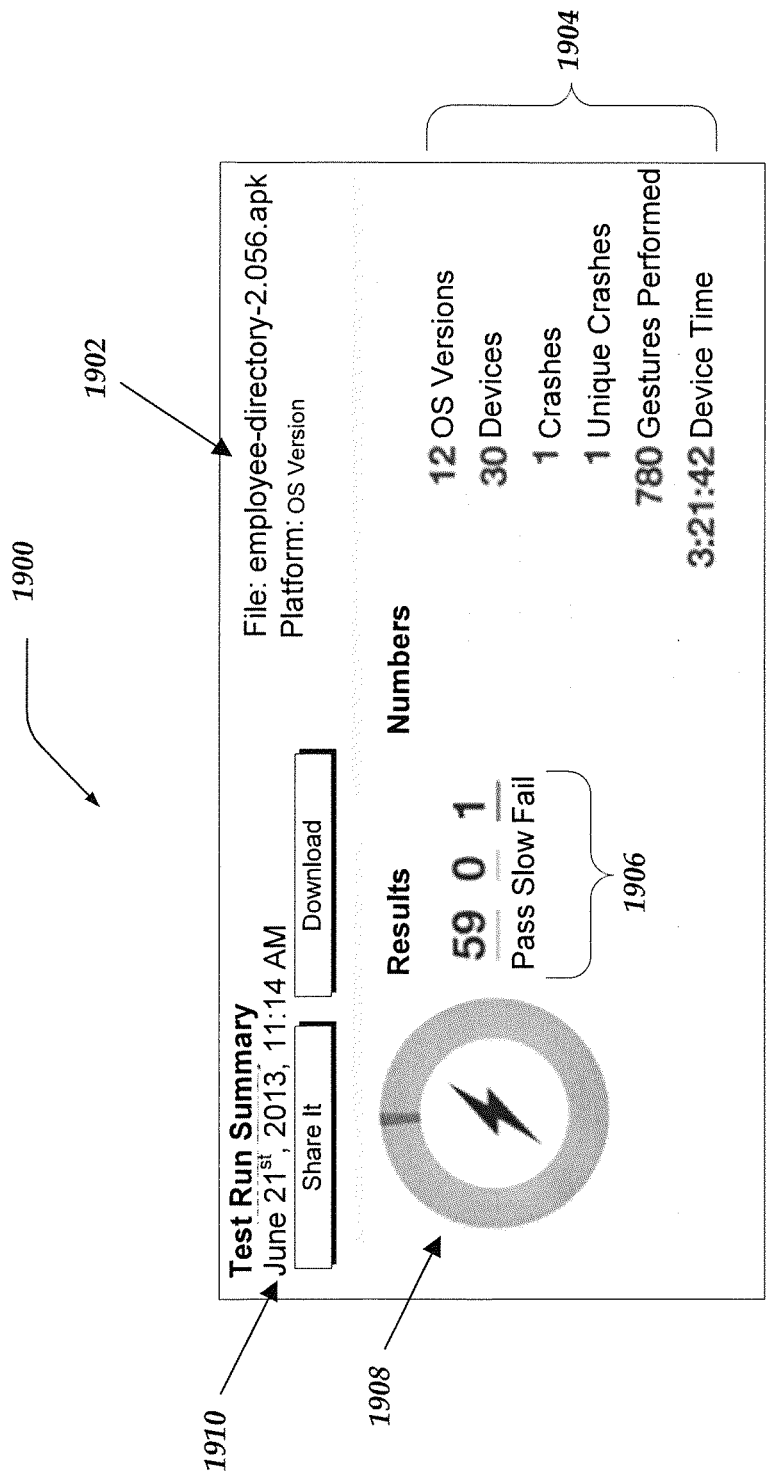

FIG. 19 illustrates interface 1900 for testing mobile applications in accordance with at least one of the various embodiments. Interface 1900 may represent summary information related to a recent test run. In at least one of the various embodiments, labels 1902 may include the application file name and operating system platform for the mobile application that was tested. Also, in at least one of the various embodiments, various summary metrics, such as metrics 1904 may be displayed to give a user immediate feedback of the test run. In at least one of the various embodiments, based on a review of metrics 1904, a user may determine if further exploration of the test results may be useful.

In at least one of the various embodiments, results summary 1906 may show a summary of the results the tests that comprised the test runs. In this example, summary 1906 indicates that 59 tests passed, 0 were slow, and 1 failed. In at least one of the various embodiments, circle graph 1908 may be used to provide a graphical representation of summary 1906, where each segment of circle graph 1908 may be color coded to represent the number of tests that passed, were slow, or failed.

In at least one of the various embodiments, labels 1910 may show additional information, such as, the date and time the test runs occurred. Also, in at least one of the various embodiments, there may be buttons or links provided to enable a user to share the results (e.g., by email, SMS, or social network tools), download the test results to a local computer, or the like.

Figure 20:
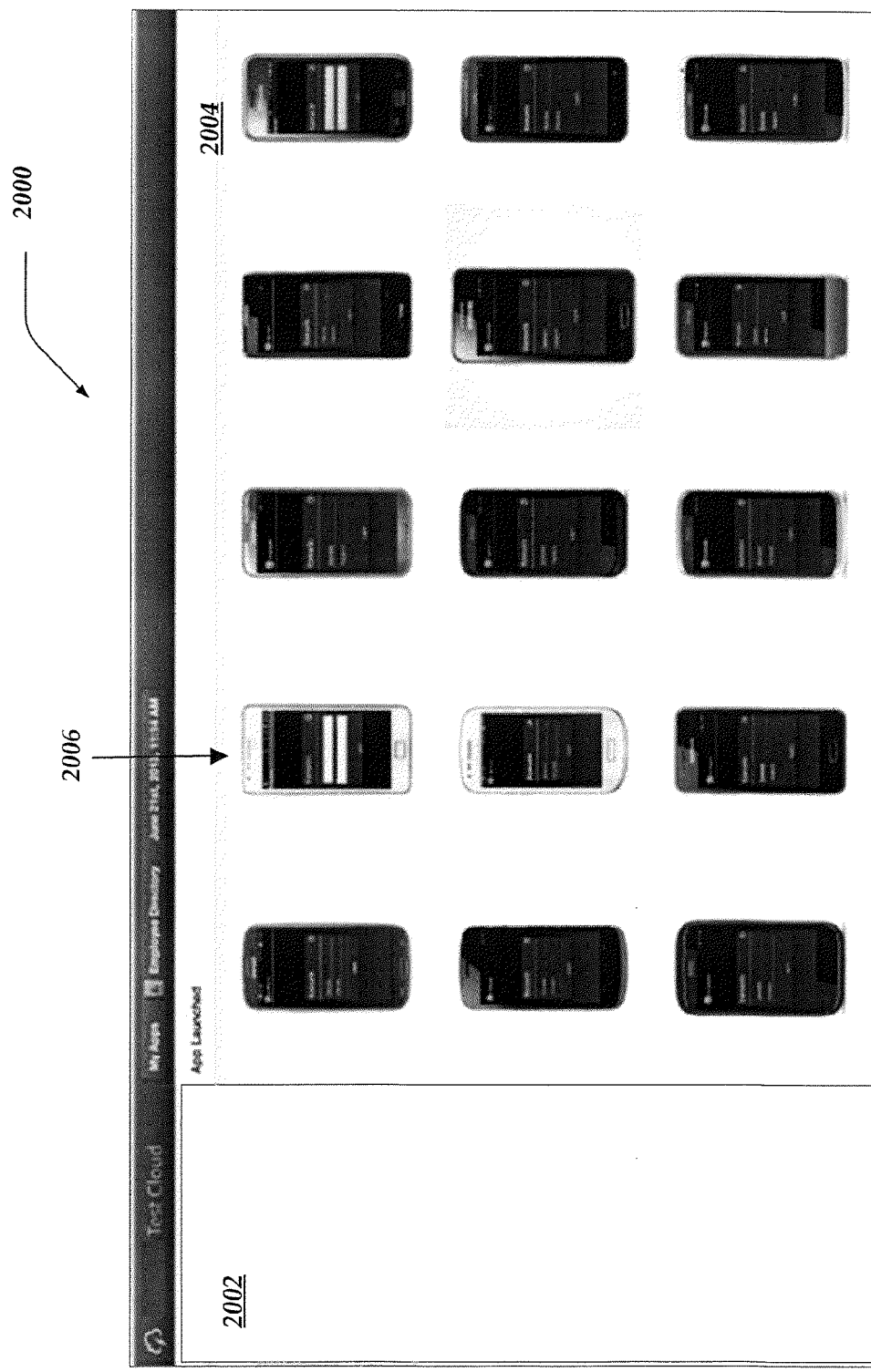

FIG. 20 illustrates user interface 2000 for reviewing test run results for a mobile application testing platform, in accordance with at least one of the various embodiments. In at least one of the various embodiments, interface 2000 may include sidebar pane 2002 that may be arranged to tests, test step and test results. And, in at least one of the various embodiments, interface 2000 may include grid view 2004 for displaying the screenshots of multiple mobile computers. For convenience and clarity, illustrative contents for sidebar 2002 are omitted here in FIG. 20; however, illustrative sidebar content is shown and described in FIG. 21.

In at least one of the various embodiments, grid view 2004 may include screenshots for each mobile computer a mobile application was tested on. The screenshot for each mobile computer may correspond to the test step that may be selected in sidebar 2002 with each synchronized to the same test step. Thus, in at least one of the various embodiments, a user can see the user interface progression for the mobile application on the different mobile computers. In at least one of the various embodiments, as different test steps and/or tests may be selected the screenshots of the mobile computers will changed to the screenshot that corresponds to the selected test and/or test step. Viewing the multiple mobile computers together enables users to identify potential problems with how the user-interface for mobile computer may be rendering the mobile application. In some cases, user interface problems may be visible to the naked eye, even though the corresponding test may indicate no defect.

For example, in at least one of the various embodiments, if the current test is performing a "user login" for the application, mobile computer 2006, may require a tester to take a closer look. In this example, mobile computer 2006 appears to be one of the few mobile computers that use white backgrounds in the two displayed fields (e.g., username, and password). Thus, if the mobile application is programmed to use a white font for this portion of the application, a user may have difficulty reading values they entered into the login page. Viewing multiple (some or all) mobile computers together may improve the probability that a user may notice that mobile computer 2006 may be behaving differently than most other mobile computers in the test.

Figure 21:
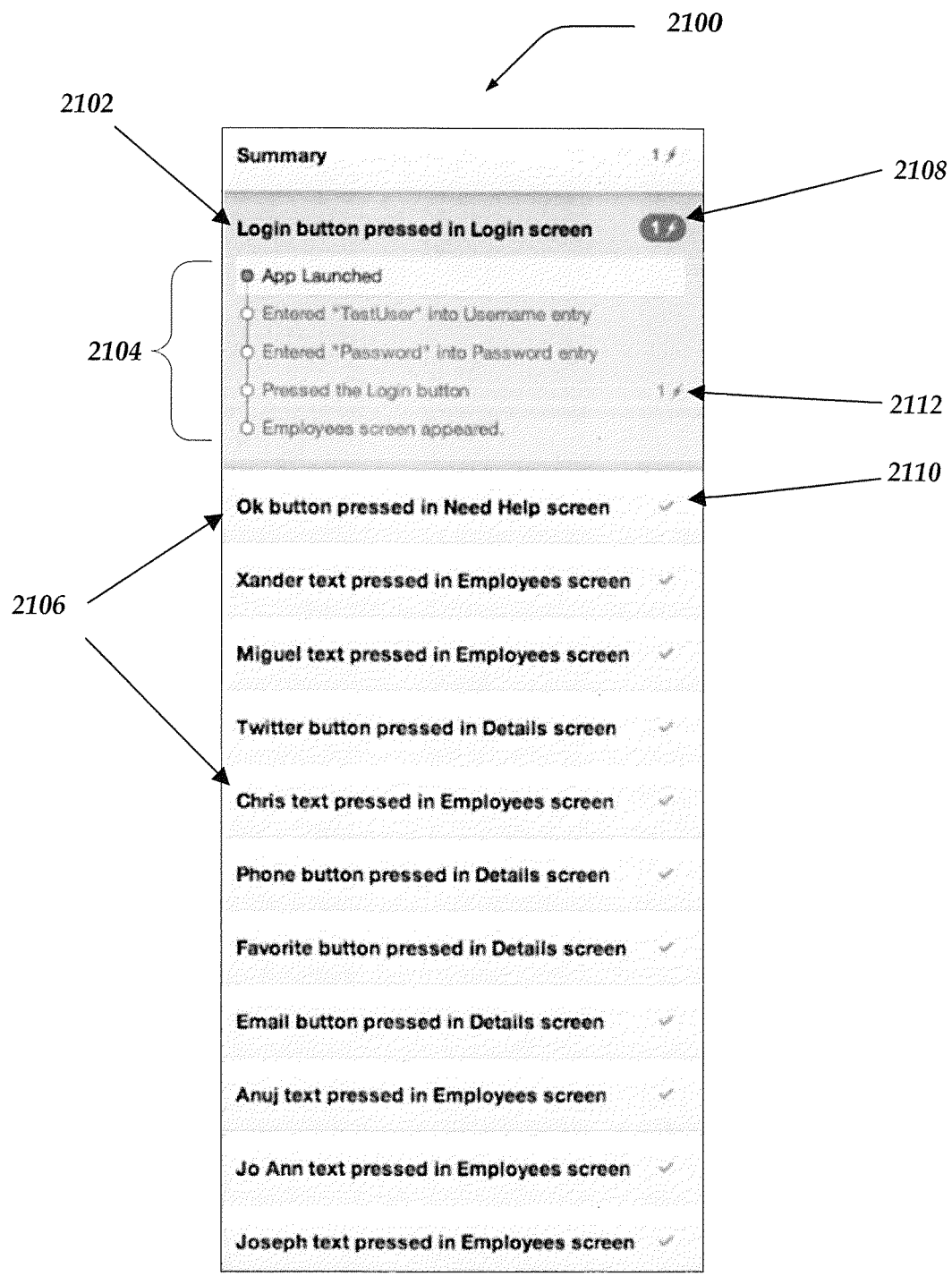

FIG. 21 illustrates sidebar 2100 for a mobile application testing platform in accordance with at least one of the various embodiments. In at least one of the various embodiments, sidebar 2100 may include a list of each test and test step that comprised a test run. In at least one of the various embodiments, each test may be displayed to show the name and/or description of the test, the results of the test, name and/or descriptions of one or more test steps for each test, and so on. In at least one of the various embodiments, sidebar 2100 may be a scrollable user-interface to enable tests that may be hidden view to be displayed.

In this example, in at least one of the various embodiments, test 2102 is shown with a description of "Login button pressed in Login screen." Here, as shown, test 2102 has been expanded to show test steps 2104 that may comprise test 2102. Further, within test steps 2104, the individual test step that is currently active is indicated (e.g., "App Launched"). The indicated test step may correspond with the mobile computer screenshots that may be displayed in an accompanying grid view, such as, grid view 2004 in FIG. 20. Sidebar 2100 further, includes names and/or descriptions for unexpanded tests 2106. In at least one of the various embodiments, a user may expand tests 2106 by clicking with a mouse, arrow keys, or otherwise selecting the test, to expose the test steps that may comprise the test.

In at least one of the various embodiments, tests listing may include emblems, such as, emblem 2108, emblem 2110, or the like. In at least one of the various embodiments, emblems may enable critical information relating to a test to be provided to a user. For example, emblem 2108 may indicate that the corresponding test includes a failed test step. Likewise, emblem 2110 may indicate that the corresponding test passed, also indicating that each included test step passed as well.

Furthermore, in at least one of the various embodiments, test steps may be marked with emblems to convey additional information as well. For example, emblem 2112 indicates that the test step named "Pressed the Login button" has recorded at least one fail. In at least one of the various embodiments, emblems may be color coded, such that the color corresponds to one or more of importance, priority, type of information, or the like. Likewise, the particular symbol used for the emblems may correspond to one or more of importance, priority, type of information, or the like.

In at least one of the various embodiments, the display order of other tests in a sidebar may be sorted and/or grouped by based on various criteria. See, FIG. 14 and its accompanying discussion.

Figure 22:
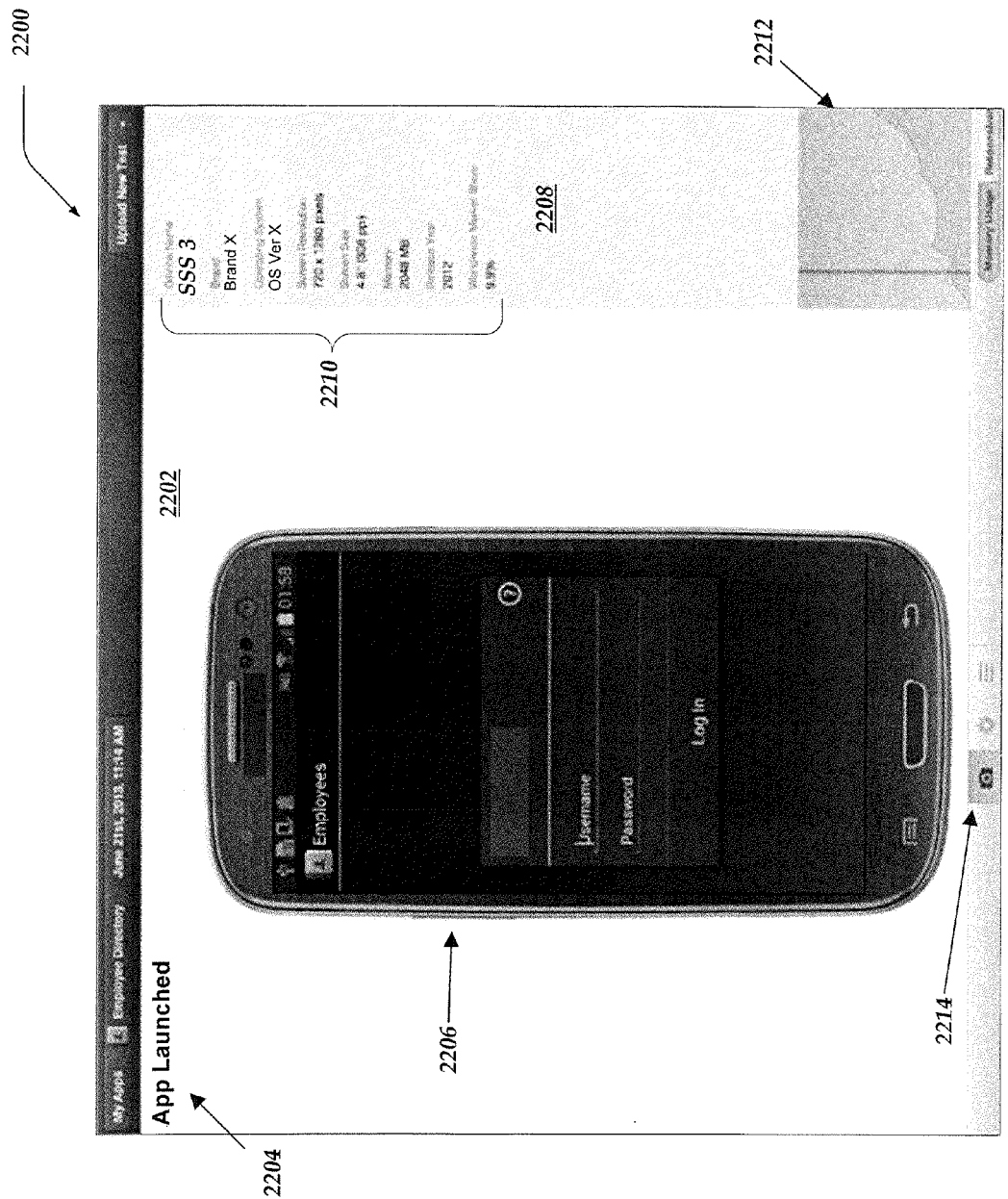

FIG. 22 illustrates user interface 2200 for displaying mobile computer details on a mobile application testing platform in accordance with at least one of the various embodiments. In at least one of the various embodiments, while viewing or browsing a grid view, such as, grid view 2004 in FIG. 20, a user may select to view the detail information for a particular mobile computer. If a detail view is displayed, detail pane 2202 may be displayed in place of the grid view. In some embodiments, detail pane 2202 may be arranged to be a popup window, rather than replacing the grid view. In at least one of the various embodiments, the current test step that corresponds to the detail view may be displayed in a label, such as, label 2204. Also, in at least one of the various embodiments, an expanded (zoomed) view of the mobile computer screenshots, such as, screenshot 2206 may be display. Screenshot 2206 may correspond with the test step that may be selected in a sidebar pane.

In at least one of the various embodiments, a side pan, such as, side pane 2208, may include additional information that corresponds to the selected mobile computer. For example, various characteristics of the mobile computer may be displayed in information list 2210. In at least one of the various embodiments, information list 2210 may include device information, such as, the make and model, operating system with version, screen size, screen resolutions, memory capacity, market share, or the like. Also, in at least one of the various embodiments, other information, such as, metric graph 2212 may be displayed to show how the selected mobile computer may be performing. In some cases, multiple metrics may be displayed as well as metrics from other mobile computers, test runs, applications, averages, or the like, for comparison purposes. Furthermore, in at least one of the various embodiments, if relevant significant deviations from normal have occurred they may be emphasized with additional user-interface techniques to bring a user's attention to the deviations.

In at least one of the various embodiments, addition feature buttons, such as, feature buttons 2214, may enable a user to perform various relevant actions, such as, capture an image of detail pane 2202, adjust settings and configurations, or the like.

Figure 23:
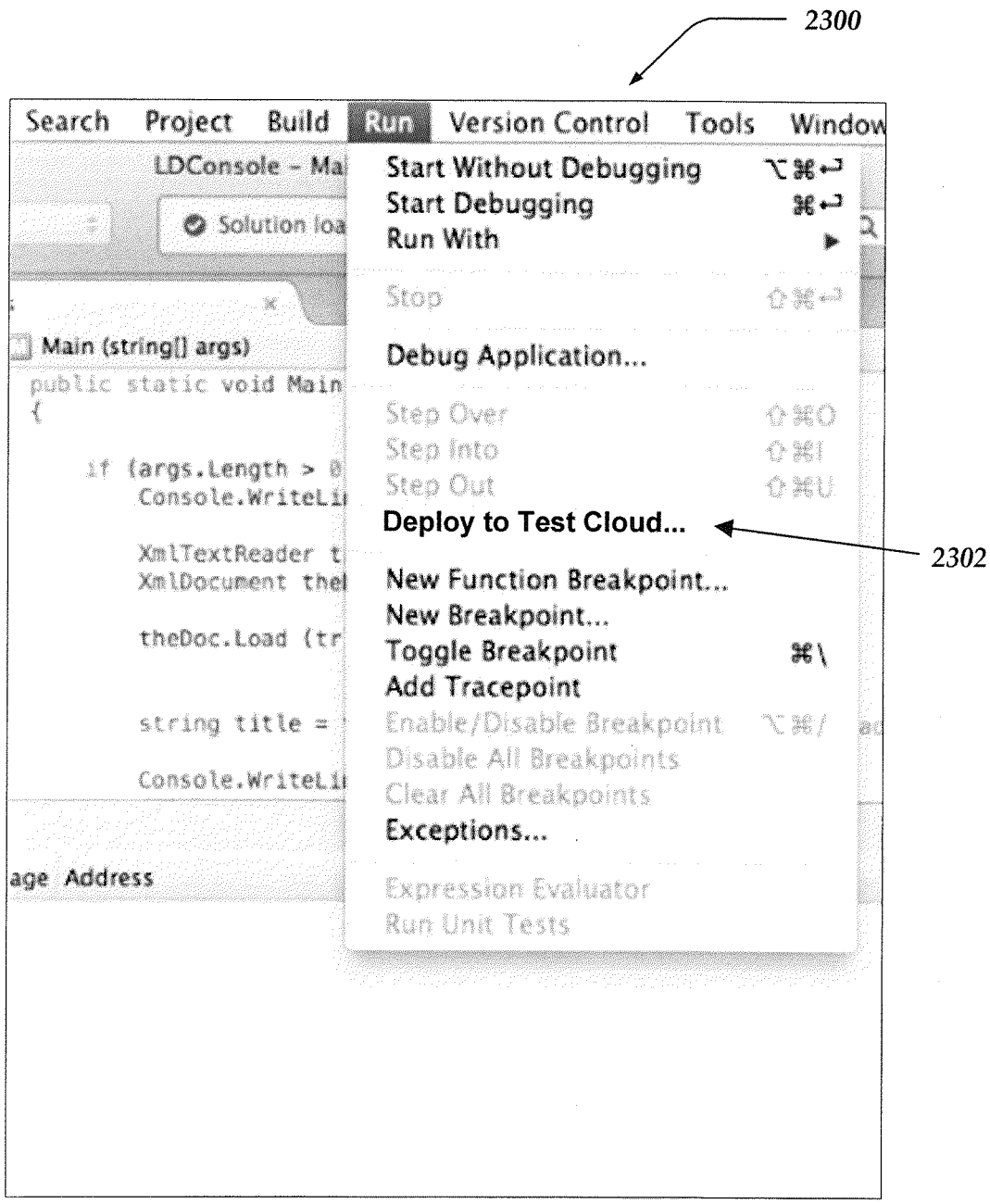

FIG. 23 illustrates a portion of integrated development environment 2300 that may be integrated with a mobile application testing platform in accordance with at least one of the various embodiments. In at least one of the various embodiments, an IDE may be integrated with a mobile application testing environment as described in conjunction with FIG. 15. In at least one of the various embodiments, at least one way to integrate an IDE with a mobile application testing platform may be to provide link in a menu of the IDE, such as, menu link 2302. Where upon activation, the current mobile application in the IDE may be uploaded to a mobile application testing platform for testing.

FIG. 24 shows an example of a portion of test script 2400 in accordance with at least one of the various embodiments. In at least one of the various embodiments, as discussed above, the mobile application testing platform may be arranged to accommodate test scripts comprised of one or more various computer programming languages. In this example, test script 2400 is a portion of a larger test script written in the C# (C-Sharp) computer language. Here, line 2402 and line 2404 direct the test application to enter input data for particular fields in a user-interface (UI) form on the application under test. In this case, line 2402 and 2404 are entering a username and a password into a login form of a mobile application. Line 2406 shows how a command may be sent to the application to simulate an action. In this case, the action is pressing the "Log-In" button after the data from lines 2402 and 2404 is entered into the UI form. Next, line 2408 indicates that test application should wait for the mobile application to display a UI screen that is named "Main Screen". After, the screen appears, line 2410 includes a test to see if the main screen is showing the output of "Logged In". And finally, in this example, line 2412 shows that the test will capture a screenshot of the mobile computer being tested. One of ordinary skill in the art will appreciate the test scripts may include more or fewer other commands and objects than those shown in FIG. 24. Likewise, in at least one of the various embodiments, portions of test scripts may be grouped into called functions/routines and/or classes (for objects) and so on. Generally, the mobile application testing platform may be arranged to exploit the programming features of each computer language. And, it may be arranged to provide APIs, libraries, or the like, appropriate for generating tests for mobile applications targeted to run on one or more mobile computers.

What is claimed as new and desired to be protected by Letters Patent of the United States is:

1. A method for testing mobile applications over a network using a computer that is operative to perform actions, comprising:

providing a mobile application, at least one test script, and at least one mobile computer criteria to the computer, wherein the mobile computer criteria includes at least a type of operating system for the mobile application;
determining at least one of a plurality of mobile computers based on at least the mobile computer criteria, wherein each determined mobile computer is in communication with the computer;
employing the computer to install the mobile application on each determined mobile computer;
performing each portion of the at least one test script for the mobile application on each determined mobile computer, wherein a result for each performed portion is stored by the computer;
generating at least one screenshot on each determined mobile computer based on at least one performed portion of the at least one test script, wherein the at least one screenshot is stored by the computer;
concurrently displaying a plurality of screenshots for each determined mobile computer in a user interface, wherein each screenshot corresponds to execution of at least one portion of the at least one test script; and
generating a displayable report that includes each screenshot and a result for each performed portion of the at least one test script.

2. The method of claim 1, further comprising, generating at least one performance metric for each determined mobile computer, wherein the at least one performance metric corresponds to execution of at least one portion of the at least one test script.

3. The method of claim 1, wherein determining the at least one mobile computer, further comprises, determining at least one of a screen size, a screen resolution, an operating system, an input method, a processor speed, a memory capacity, a manufacturer, a storage media capacity, or a market share for sales in at least one country.

4. The method of claim 1, further comprising displaying each determined mobile computer in a grid view interface that includes screenshots of an exterior of each mobile computer, wherein each displayed mobile computer exterior is rendered at a scale relative to a size of each other.

5. The method of claim 1, further comprising:
displaying a sidebar interlace that includes at least one list item, wherein each list item corresponds to at least one portion of the at least one test script;
determining a result status for each test based on the results of the execution of at least one portion of the at least one test script; and
displaying at least one icon in each list item, wherein the at least one icon indicates at least the result status of the execution of at least one portion of the at least one test script that corresponds to the list item.

6. The method of claim 1, further comprising:
determining a comparison for at least one performance metric of each determined mobile computer; and
displaying each variation of the at least one performance metric for each determined mobile computer based on at least one of the determined comparison and a previously determined comparison for at least another mobile computer.

7. The method of claim 1, further comprising, in response to a successful build of the mobile application on a developer computer, activating a user interface on art integrated development environment that enables testing of the mobile application on each determined mobile computer.

8. A system for testing mobile applications, comprising:
a client network computer, including:
a transceiver tor communicating over the network;
a memory for storing at least instructions;
a processor device that is operative to execute instructions that enable actions, including:
providing a mobile application, at least one test script, and at least one mobile computer criteria to a network computer, wherein the mobile computer criteria includes at least a type of operating system for the mobile application; and
the network computer, including:
a transceiver for communicating over the network;
a memory for storing at least instructions;
a processor device that is operative to execute instructions that enable actions, including:
determining at least one of a plurality of mobile computers based on at least the mobile computer criteria, wherein each determined mobile computer is in communication with the network computer;
employing the network computer to install the mobile application on each determined mobile computer;
performing each portion of the at least one test script for the mobile application on each determined mobile computer, wherein a result for each performed portion is stored by the network computer;
generating at least one screenshot on each determined mobile computer based on at least one performed portion of the at least one test script, wherein the at least one screenshot is stored by the network computer;
concurrently displaying a plurality of screenshots for each determined mobile computer in a user interface, wherein each screenshot corresponds to execution of at least one portion of the at least one test script; and
generating a displayable report that includes each screenshot and a result for each performed portion of the at least one test script.

9. The system of Claim 8, further comprising, generating at least one performance metric for each determined mobile computer, wherein the at least one performance metric corresponds to execution of at least one portion of the at least one test script.

10. The system of claim 8, wherein determining the at least one mobile computer, further comprises, determining at least one of a screen size, a screen resolution, an operating system, an input method, a processor speed, a memory capacity, a manufacturer, a storage media capacity, or a market share for sales in at least one country.

11. The method of claim 8, further comprising displaying each determined mobile computer in a grid view interface that includes screenshots of an exterior of each mobile computer, wherein each displayed mobile computer exterior is rendered at a scale relative to a size of each other.

12. The system of claim 8, further comprising:
displaying a sidebar interface that includes at least one list item, wherein each list item corresponds to at least one portion of the at least one test script;
determining a result status for each test based on the results of the execution of at least one portion of the at least one test script; and
displaying at least one icon in each list item, wherein the at least one icon indicates at least the result status of the execution of at least one portion of the at least one test script that correspond to the list item.

13. The system of claim 8, further comprising:
determining a comparison for at least one performance metric of each determined mobile computer; and
displaying each variation of the at least one performance metric for each determined mobile computer based on at least one of the determined comparison and a previously determined comparison for at least another mobile computer.

14. The system of claim 8, further comprising, in response to a successful build of the mobile application on a developer computer, activating a user interface on an integrated development environment that enables testing of the mobile application on each determined mobile computer.

15. A network computer for testing mobile applications, comprising:
a transceiver for communicating over the network;
a memory for storing at least instructions;
a processor device that is operative to execute instructions that enable actions, including:
providing a mobile application, at least one test script, and at least one mobile computer criteria to the network computer, wherein the mobile computer criteria includes at least a type of operating system for the mobile application;
determining at least one of a plurality of mobile computers based on at least the mobile computer criteria, wherein each determined mobile computer is in communication with the network computer;
employing the network computer to install the mobile application on each determined mobile computer;
performing each portion of the at least one test script for the mobile application on each determined mobile computer, wherein a result for each performed portion is stored by the network computer;
generating at least one screenshot on each determined mobile computer based on at least one performed portion of the at least one test script, wherein the at least one screenshot is stored by the network computer;
concurrently displaying a plurality of screenshots for each determined mobile computer in a user interface, wherein each screenshot corresponds to execution of at least one portion of the at least one test script; and
generating a displayable report that includes each screenshot and a result for each performed portion of the at least one test script.

16. The network computer of claim 15, further comprising, generating at least one performance metric for each determined mobile computer, wherein the at least one performance metric corresponds to execution of at least one portion of the at least one test script.

17. The network computer of claim 15, wherein determining the at least one mobile computer, further comprises, determining at least one of a screen size, a screen resolution, an operating system, an input method, a processor speed, a memory capacity, a manufacturer, a storage media capacity, or a market share for sales in at least one country.

18. The network computer of claim 15, further comprising displaying each determined mobile computer in a grid view interlace that includes screenshots of an exterior of each mobile computer, wherein each displayed mobile computer exterior is rendered at a scale relative to a size of each other.

19. The network computer of claim 15, further comprising:
displaying a sidebar interface that includes at least one list item, wherein each list item corresponds to at least one portion of the at least one test script;
determining a result status for each test based on the results of the execution of at least one portion of the at least one test script; and
displaying at least one icon in each list item, wherein the at least one icon indicates at least the result status of the execution of at least one portion of the at least one test script that corresponds to the list item.

20. The network computer of claim 15, further comprising:
determining a comparison for at least one performance metric of each determined mobile computer; and
displaying each variation of the at least one performance metric for each determined mobile computer based on at least one of the determined comparison and a previously determined comparison for at least another mobile computer.

21. A processor readable non-transitive storage media that includes instructions for testing mobile applications, wherein a computer that executes at least a portion of the instructions is enabled to perform actions, comprising:
providing a mobile application, at least one test script, and at least one mobile computer criteria to the computer, wherein the mobile computer criteria includes at least a type of operating system for the mobile application;
determining at least one of a plurality of mobile computers based on at least the mobile computer criteria, wherein each determined mobile computer is in communication with the computer;
employing the computer to install the mobile application on each determined mobile computer;
performing each portion of the at least one test script for the mobile application on each determined mobile computer, wherein a result for each performed portion is stored by the computer;
generating at least one screenshot on each determined mobile computer based on at least one performed portion of the at least one test script, wherein the at least one screenshot is stored by the computer;
concurrently displaying a plurality of screenshots for each determined mobile computer in a user interface, wherein each screenshot corresponds to execution of at least one portion of the at least one test script; and
generating a displayable report that includes each screenshot and a result for each performed portion of the at least one test script.

22. The media of claim 21, further comprising, generating at least one performance metric for each determined mobile computer, wherein the at least one performance metric corresponds to execution of at least one portion of the at least one test script.

23. The media of claim 21, wherein determining the at least one mobile computer, further comprises, determining at least one of a screen size, a screen resolution, an operating system, an input method, a processor speed, a memory capacity, a manufacturer, a storage media capacity, or a market share for sales in at least one country.

24. The media of claim 21, further comprising, displaying each determined mobile computer in a grid view interface that includes screenshots of an exterior of each mobile computer, wherein each displayed mobile computer exterior is rendered at a scale relative to a size of each other.

25. The media of claim 21, further comprising:
displaying a sidebar interface that includes at least one list item, wherein each list item corresponds to at least one portion of the at least one test script;
determining a result status for each lest based on the results of the execution of at least one portion of the at least one lest script, and
displaying at least one icon in each list item, wherein the at least one icon indicates at least the result status of the execution of at least one portion of the at least one test script that corresponds to the list item.

26. The system of claim 21, further comprising:
  determining a comparison for at least one performance metric of each determined mobile computer; and
  displaying each variation of the at least one performance metric for each determined mobile computer based on at least one of the determined comparison and a previously determined comparison for at least another mobile computer.

* * * * *

UNITED STATES PATENT AND TRADEMARK OFFICE
CERTIFICATE OF CORRECTION

PATENT NO. : 8,856,748 B1
APPLICATION NO. : 14/029631
DATED : October 7, 2014
INVENTOR(S) : Larsen et al.

It is certified that error appears in the above-identified patent and that said Letters Patent is hereby corrected as shown below:

In the specification

In Column 3, Line 15, delete "in art the" and insert -- in the art --, therefor.

In Column 18, Line 22, delete "be ran" and insert -- be run --, therefor.

In Column 20, Line 55, delete "come" and insert -- some --, therefor.

In Column 26, Line 48, delete "Information" and insert -- information --, therefor.

In the claims

In Column 33, Line 35, in Claim 4, delete "comprising" and insert -- comprising, --, therefor.

In Column 33, Line 41, in Claim 6, delete "interlace" and insert -- interface --, therefor.

In Column 33, Line 61, in Claim 7, delete "on art" and insert -- on an --, therefor.

In Column 33, Line 66, in Claim 8, delete "tor" and insert -- for --, therefor.

In Column 34, Line 36, in Claim 9, delete "Claim 8," and insert -- claim 8, --, therefor.

In Column 34, Line 47, in Claim 11, delete "method" and insert -- system --, therefor.

In Column 34, Line 47, in Claim 11, delete "comprising" and insert -- comprising, --, therefor.

In Column 35, Line 54, in Claim 18, delete "comprising" and insert -- comprising, --, therefor.

In Column 35, Line 56, in Claim 18, delete "interlace" and insert -- interface --, therefor.

Signed and Sealed this
Third Day of May, 2016

Michelle K. Lee
*Director of the United States Patent and Trademark Office*

CERTIFICATE OF CORRECTION (continued)
U.S. Pat. No. 8,856,748 B1

In the claims

In Column 36, Line 61, in Claim 25, delete "lest based" and insert -- test based --, therefor.

In Column 36, Line 63, in Claim 25, delete "lest script," and insert -- test script; --, therefor.

In Column 37, Line 1, in Claim 26, delete "system" and insert -- media --, therefor.